US012743841B2

(12) United States Patent
Li et al.

(10) Patent No.: US 12,743,841 B2
(45) Date of Patent: Sep. 22, 2026

(54) NEURAL HEAD AVATAR CONSTRUCTION FROM AN IMAGE

(71) Applicant: NVIDIA Corporation, Santa Clara, CA (US)

(72) Inventors: Xueting Li, Sunnyvale, CA (US); Shalini De Mello, San Francisco, CA (US); Sifei Liu, Santa Clara, CA (US); Koki Nagano, Playa Vista, CA (US); Umar Iqbal, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 168 days.

(21) Appl. No.: 18/653,723

(22) Filed: May 2, 2024

(65) Prior Publication Data

US 2024/0404174 A1 Dec. 5, 2024

Related U.S. Application Data

(60) Provisional application No. 63/505,454, filed on Jun. 1, 2023.

(51) Int. Cl.
*G06T 15/08* (2011.01)
*G06T 13/40* (2011.01)
(Continued)

(52) U.S. Cl.
CPC .............. *G06T 15/08* (2013.01); *G06T 13/40* (2013.01); *G06V 10/82* (2022.01); *G06V 40/174* (2022.01);
(Continued)

(58) Field of Classification Search
CPC ......... G06T 13/40; G06T 15/08; G06T 19/20; G06T 2210/56; G06T 2219/2021;
(Continued)

(56) References Cited

U.S. PATENT DOCUMENTS 11,055,514 B1 * 7/2021 Cao ...................... G06V 40/161
2021/0374402 A1 * 12/2021 Kim ...................... G06V 40/19
(Continued)

OTHER PUBLICATIONS

Paysan, P., et al., "A 3D Face Model for Pose and Illumination Invariant Face Recognition," 2019, pp. 1-6.
(Continued)

*Primary Examiner* — Said Broome
(74) *Attorney, Agent, or Firm* — Leydig, Voit & Mayer, Ltd.

(57) ABSTRACT

Systems and methods are disclosed that animate a source portrait image with motion (i.e., pose and expression) from a target image. In contrast to conventional systems, given an unseen single-view portrait image, an implicit three-dimensional (3D) head avatar is constructed that not only captures photo-realistic details within and beyond the face region, but also is readily available for animation without requiring further optimization during inference. In an embodiment, three processing branches of a system produce three tri-planes representing coarse 3D geometry for the head avatar, detailed appearance of a source image, as well as the expression of a target image. By applying volumetric rendering to a combination of the three tri-planes, an image of the desired identity, expression and pose is generated.

23 Claims, 17 Drawing Sheets

Source Image

Target Image

Output Image

(51) Int. Cl.

| | |
|---|---|
| ***G06V 10/82*** | (2022.01) |
| ***G06V 40/16*** | (2022.01) |
| *G06V 10/774* | (2022.01) |
| *G06V 10/94* | (2022.01) |

(52) U.S. Cl.
CPC ........ *G06T 2210/56* (2013.01); *G06V 10/774* (2022.01); *G06V 10/95* (2022.01)

(58) Field of Classification Search
CPC ...... G06V 10/774; G06V 10/82; G06V 10/95; G06V 40/174
See application file for complete search history.

(56) References Cited

U.S. PATENT DOCUMENTS

| | | | | |
|---|---|---|---|---|
| 2023/0112302 | A1* | 4/2023 | Marks | G06T 19/20 345/419 |
| 2024/0221258 | A1* | 7/2024 | Chai | G06T 17/00 |

OTHER PUBLICATIONS

Afchar, D., et al., "MesoNet: a compact facial video forgery detection network," In 2018 IEEE International Workshop on Information Forensics and Security (WIFS), 2018.
Athar, S., et al., "RigNeRF: Fully controllable neural 3D portraits," In CVPR, 2022.
Bai, Y., et al., "High-fidelity facial avatar reconstruction from monocular vieo with generative priors," arXiv preprint arXiv:2211.15064, 2022.
Bai, Z.,, et al., "Learning personalized high quality volumetric head avatars from monocular RGB videos," arXiv Preprint arXiv:2304.01436, 2023.
Barron, J., et al., "MIP-NeRF: a multiscale representation for anti-alieasing neural radiance fields," ICCV, 2021.
Bhattarai, A., et al., "TriplaneNet: An encoder for EG3D inversion," arXiv preprint arXiv:2303.13497, 2023.
Blanz, V., et al., "A morphable model for the synthesis of 3D faces," In Proceedings of the 26th Annual Conference on Computer Graphics and Interactive Techniques, 1999.
Bulat, A., et al., "How far are we from solving the 2D and 3D face alignment problem? (and a dataset of 230,000 3D facial landmarks" In ICCV, 2017.
Chan, E.R., et al., "Efficient geometry-aware 3D generative adversarial networks," In CVPR, 2022.
Chen, A., et al., "TensoRF: Tensorial Radiance Fields," In ECCV, 2022.
Cozzolino, D., et al., "ID-reveal: Identity-aware deepfake video detection," In CVPR, 2021.
Cozzolino, D., et al., "Forensic Transfer: Weakly-supervised domain adaptation for forgery detection," arXiv preprint arXiv:1812.02510, 2018.
Danecek, R., et al., "EMOCA: Emotion driven monocular face capture and animation," In CVPR, 2022.
Deng, J., et al., "ArcFace: Additive angular margin loss for deep face recognition," In CVPR, 2019.
Deng, Y., et al., "Learning detailed radiance manifolds for high-fidelity and 3D-consistent portrait synthesis from monocular image," arXiv prepring arXiv:2211.13901, 2022.
Deng, Y., et al., "Accurate 3D face reconstruction with weakly-supervised learning: From single image to image set," In CVPRW, 2019.
Drobyshev, N., et al., "MegaPortraits: One-shot megapixel neural head avatars," 2022.
Egger, B., et al., "3D morphable face models—past, present, and future," ACM Transactions on Graphics (TOG), 2020.
Feng, Y., et al., "Learning an animatable detailed 3D face model from in-th-wild images," SIGGRAPH, 2021.
Fruhstuck, A., et al., "VIVE3D: Viewpoint-independent video editing using 3D-aware GANs," In CVPR, 2023.
Gafni, G., et al., "Dynamic neural radiance fields for monocular 4D facial avatar reconstruction," In CVPR, 2021.
Gao, C., et al., "Portrait neural radiance fields from a single image," arXiv preprint arXiv:2012.05903, 2020.
Gao, X., et al., "Reconstructing personalized semantic facial nerf models from monocular video," SIGGRAPH Asia, 2022.
Guo, Y., et al., "AD-NeRF: Audio driven neural radiance fields for talking head synthesis," In ICCV, 2021.
Hong, Y., et al., "HeadNeRF: A real-time NeRF-based parametric head model," In CVPR, 2022.
Johnson, J., et al., "Perceptual losses for real-time style transfer and super-resolution," In ECCV, 2016.
Karras, T., et al., "A style-based architecture for generative adversarial networks," In CVPR, 2019.
Karras, T., et al., "Analyzing and improving the image quality of styleGAN," In CVPR, 2020.
Ke, Z., et al., "MODNet: Real-time trimap-free portrait matting via objective decomposition," In AAAI, 2022.
Khakhulin, T., et al., "Realistic one-shot mesh-based head avatars," In ECCV, 2022.
Kingma, D., et al., "ADAM: A method for stochastic optimization," arXiv preprint arXiv:1412.6980, 2014.
Kirschstein, T., et al., "NeRSemble: Multi-view radiance field reconstruction of human heads," 2023.
Lee, C.H., et al., "MaskGAN: Towards diverse and interactive facial image manipulation," In CVPR, 2020.
Lee, Y., et al., "Exp-GAN: 3D-aware facial image generation with expression control," In ACCV, 2022.
Lei, B., et al., "A hierarchical representation network for accurate and detailed face reconstruction from in-the-wild images," 2023.
Li, R., et al., "Learning formation of physically-based face attributes," In CVPR, 2020.
Li, T., et al., "Learning a model of facial shape and expression from 4D scans," ACM Transactions on Graphics, Proc. SIGGRAPH Asia, 2017.
Li, W., et al., "One-shot high-fidelity talking-head synthesis with deformable neural radiance field," In CVPR, 2023.
Ma, Z., et al., "OTAvatar: One-shot talking face avatar with controllable tri-plane rendering," arXiv preprint arXiv:2303.14662, 2023.
Mildenhall, B.,, et al., "NeRF: Representing scenes as neural radiance fields for view synthesis," in ECCV, 2020.
Mirzaei, M.S., et al., "Animgan: A spatiotemporally-conditioned generative adversarial network for character animation," In ICIP, 2020.
Muller, T., et al., "Instant neural graphics primitives with a multiresolution hash encoding," ACM Trans. Graph., 2022.
Park, K., et al., "Nerfies: Deformable neural radiance fields," ICCV, 2021.
Park, K., et al., "HyperNeRF: A higher-dimensional representation for topologically varying neural radiance fields," ACM Trans. Graph., 2021.
Parke, F.I., "A parametric model for human faces," The University of Utah, 1974.
Paszke, A., et al., "Automatic differentiation in pytorch," 2017.
Ren, Y., et al., "PIRenderer: Controllable portrait image generation via semantic neural rendering," In ICCV, 2021.
Roich, D., et al., "Pivotal tuning for latent-based editing of real images," ACM Trans. Graph., 2021.
Rossler, A., et al., "FaceForensics++: Learning to detect manipulated facial images," In ICCV, 2019.
Siarohin, A., et al., "First order motion model for image animation," NeurIPS, 2019.
Simonyan, K.,, et al., "Very deep convolutional networks for large-scale image recognition," arXiv preprint arXiv:1409.1556, 2014.
Sun, J., et al., "Next3D: Generative neural texture rasterization for 3D-aware head avatars," arXiv preprint arXiv:2211.11208, 2022.
Sun, K., et al., "Controllable 3D face synthesis with conditional generative occupancy fields," arXiv preprint arXiv:2206.08361, 2022.
Tang, J., et al., "Make-it-3D: High-fidelity 3D creation from a single image with diffusion prior," arXiv preprint arXiv:2303.14184, 2023.

(56) References Cited

OTHER PUBLICATIONS

Tang, J., et al., "Explicitly controllable 3D-aware portrait generation," arXiv preprint arXiv:2209.05434, 2022.
Teotia, K., et al., "HQ3DAvatar: High quality controllable 3D head avatar," 2023.
Tretschk, E., et al., "Non-rigid neural radiance fields: reconstruction and novel view synthesis of a dynamic scene from monocular video," In ICCV, 2021.
Trevithick, A., et al., "Real-time radiance fields for single-image portrait view synthesis," arXiv preprint arXiv:2305.02310, 2023.
Wang, T.C., et al., "One-shot free-view neural talking-head synthesis for video conferencing," In CVPR, 2021.
Wang, X., et al., "Towards real-world blind face restoration with generative facial prior," In CVPR, 2021.
Xie, E., et al., "SegFormer: Simple and efficient design for semantic segmentation with transformers," NeurIPS, 2021.
Xie, J., et al., "High-fidelity 3D Gan inversion by pseudo-multi-view optimization," arXiv preprint arXiv:2211.15662, 2022.
Xu, Z., et al., "PV3D: a 3D generative model for portrait video generation," In ICLR, 2023.
Xu, Q., et al., "Point-NeRF: Point-based neural radiance fields," arXiv preprint arXiv:2201.08845, 2022.
Xu, Y., et al., "In-N-Out: Faithful 3D Gan inversion with volumetric decomposition for face editing" arXiv preprint arXiv:2302.04871, 2023.
Yang, F., et al., "In-the-wild facial expression recognition in extreme poses," In International Conference on Graphic and Image Processing (ICGIP 2017), 2018.
Yin, F., et al., "StyleHEAT: One-shot high-resolution editable talking face generation via pre-trained styleGAN," In ECCV, 2022.
Yu, C., et al., "BiSeNET: Bilateral segmentation network for real-time semantic segmentation," In ECCV, 2018.
Yuan, Z., et al., "Make encoder great again in 3D GAN inversion through geometry and occlusion-aware encoding," arXiv preprint arXiv:2303.12326, 2023.
Zakharov, E., et al., "Fast bi-layer neural synthesis of one-shot realistic head avatars," in ECCV, 2020.
Zhang, J., et al., "FDNeRF: Few-shot dynamic neural radiance fields for face reconstruction and expression editing," In SIGGRAPH Asia, 2022.
Zhang, R., et al., "The unreasonable effectiveness of deep features as a perceptual metric," In CVPR, 2018.
Zhang, W., et al., "SadTalker: Learning realistic 3D motion coefficients for stylized audio-driven single image talking face animation," arXiv preprint arXiv:2211.12194, 2022.
Zhang, Z., et al., "Flow-guided one-shot talking face generation with a high-resolution audio-visual dataset," In CVPR, 2021.
Zhao, H., et al., "Multi-attentional deepfake detection," In CVPR, 2021.
Zheng, Y., et al., "I M Avatar: Implicit morphable head avatars from videos," In CVPR, 2022.
Zheng., Y., et al., "PointAvatar: Deformable point-based head avatars from videos," In CVPR, 2023.
Zhu, H., et al., "CelebV-HQ: A large-scale video facial attributes dataset," In ECCV, 2022.
Zhuang, P., et al., "Controllable radiance fields for dynamic face synthesis," in 3DV, 2022.
Zhuang, Y., et al., "MoFaNeRF: Morphable facial neural radiance field," In ECCV, 2022.

* cited by examiner

Source Image

Target Image

Combined identity surface and expression representation image

Output Image

NEURAL HEAD AVATAR CONSTRUCTION FROM AN IMAGE

CLAIM OF PRIORITY

This application claims the benefit of U.S. Provisional Application No. 63/505,454 titled "Generalizable One-Shot Neural Head Avatar," filed Jun. 1, 2023, the entire contents of which is incorporated herein by reference.

BACKGROUND

Conventional techniques for animating a source portrait image with the motion (i.e., pose and expression) from a target image rely on training a neural network to predict shape, expression, pose, and texture of an arbitrary source portrait image efficiently. However, such approaches often fall short in synthesizing realistic details due to limited mesh resolution and a coarse texture model. Additionally, the conventional techniques exclusively focus on the facial region while neglecting other personal characteristics such as hairstyle or glasses.

Inspired by the remarkable progress made in Generative Adversarial Networks (GANs), some recent techniques represent motion as a warping field that transforms the given source image to match the desired pose and expression. Yet, without explicit three-dimensional (3D) understanding of the given portrait image, these techniques can only rotate the head within limited angles, before exhibiting warping artifacts, unrealistic distortions and undesired identity changes across different target views. There is a need for addressing these issues and/or other issues associated with the prior art.

SUMMARY

Embodiments of the present disclosure relate to neural head avatar construction from an image. Systems and methods are disclosed that animate a source portrait image with motion (i.e., pose and expression) from a target image. In contrast to conventional systems, such as those described above, a solution is provided for a more practical but challenging scenario—given an unseen single-view portrait image, an implicit three-dimensional (3D) head avatar is constructed that not only captures photo-realistic details within and beyond the face region, but also is readily available for animation without requiring further optimization during inference.

In an embodiment, three processing branches of a system produce three tri-planes representing coarse 3D geometry for the head avatar, detailed appearance of a source image, as well as the expression of a target image. By applying volumetric rendering to a combination of the three tri-planes, an image of the desired identity, expression and pose is generated. Once trained, the system enables efficient 3D head avatar reconstruction and animation via a single forward processing pass through the processing branches. Furthermore, the system generalizes well to images not used during training.

In an embodiment, the method includes receiving a source image depicting a first subject with a first expression and extracting a 3D shape from the source to produce an identity surface associated with the first subject, where the first expression is replaced with a second expression. In an embodiment, the second expression comprises a neutral expression. The source image is processed to compute an appearance representation associated with the first subject and the appearance representation and the identity surface are integrated to produce an identity representation that, when rendered generates an output image of the first subject with the second expression.

BRIEF DESCRIPTION OF THE DRAWINGS

The present systems and methods for neural head avatar construction from an image are described in detail below with reference to the attached drawing figures, wherein.

DETAILED DESCRIPTION

Figure 1A:
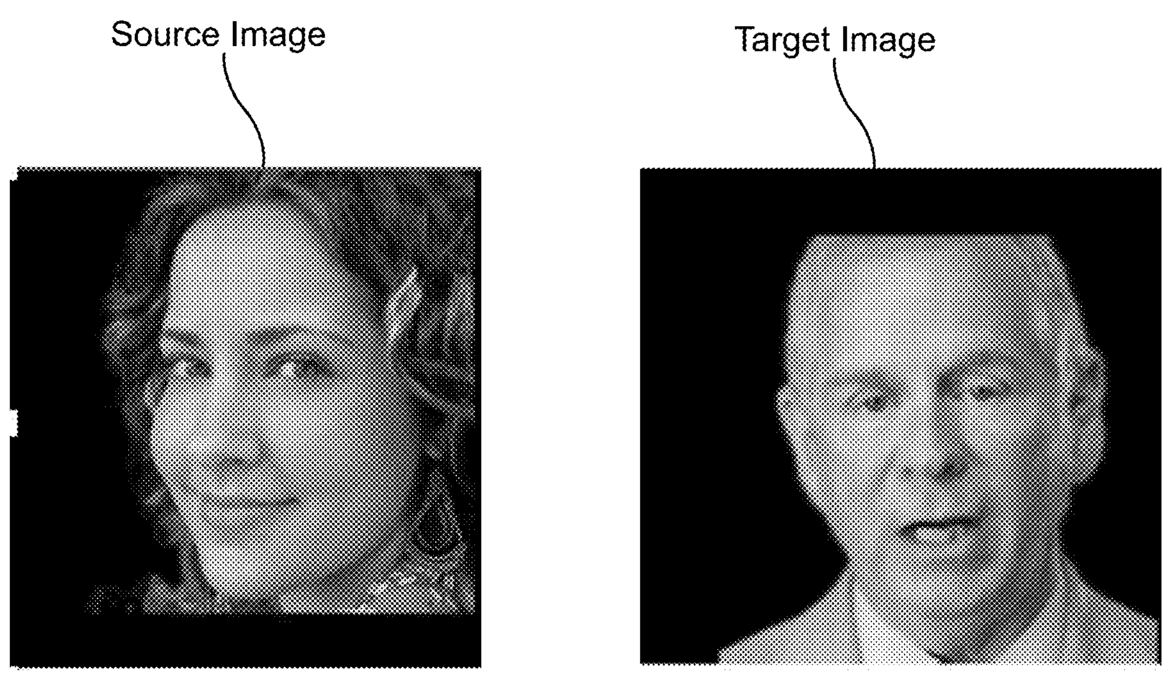
FIG. 1A illustrates a source image, target image, and an output image, in accordance with an embodiment.
Figure 1A:
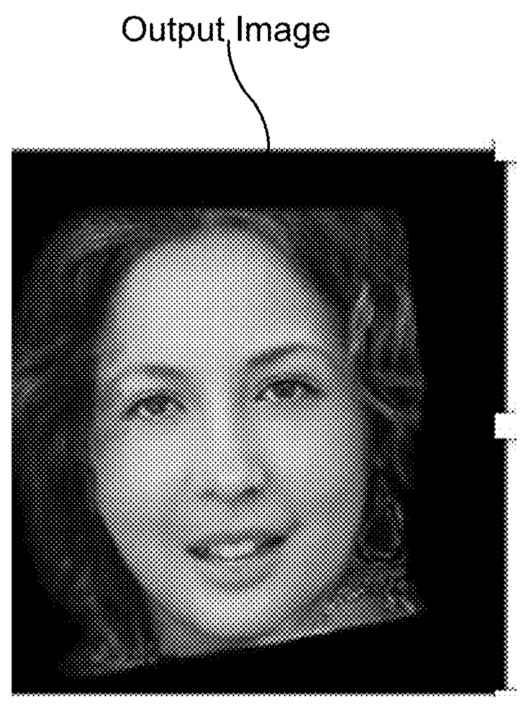

Systems and methods are disclosed related to neural head avatar construction from an image. Avatar construction is a long-standing task in computer vision that has been widely applied to video conferencing, computer games, Virtual Reality (VR) and Augmented Reality (AR). In real-world applications, synthesizing a realistic portrait image that matches the given identity and motion raises two major challenges—efficiency and high fidelity. Efficiency requires the model to generalize to arbitrary unseen identities and motion without any further optimization during inference. High fidelity demands the model to not only faithfully preserve intricate details in the input image (e.g., hairstyle, glasses, earrings), but also hallucinate plausibly whenever necessary (e.g., synthesize the occluded facial region when the input is in profile view or generate teeth when the mouth transitions from closed to open).

A head avatar construction framework includes three neural branches that disentangle and reconstruct the coarse geometry, detailed appearance, and expression of a portrait image, respectively. Specifically, given a source portrait image, a canonical (3D geometry) branch reconstructs coarse 3D geometry by producing a canonicalized identity surface in a volumetric format (e.g., tri-plane) with a neutral expression and frontal pose. To capture the fine texture and characteristic details of the input image, an appearance branch utilizes 3D data (e.g., depth) provided by the 3D geometry branch to create an appearance representation in the volumetric format (e.g., a second tri-plane) by mapping pixel values from the portrait image onto corresponding positions in the canonicalized 3D space. Finally, an expression branch takes the frontal rendering of a 3D morphable model (3DMM) with a target expression and a source identity as input. The expression branch then produces an expression representation in the volumetric format (e.g., a third tri-plane) that modifies the expression of the head avatar as desired.

In an embodiment, the identity surface and the appearance representation generated for a source image are combined to produce an identity representation having a neutral expression. The identity representation may then be combined with an expression representation generated for a target image and volumetric rendering may be used to produce a facial image with source identity and the target pose and expression. In an embodiment, the volumetric rendering is followed by a super-resolution block to produce a high-fidelity facial image. In at least one embodiment, the input image depicts of at least one human subject, avatar, or character for which an identity representation is constructed and/or a facial image is generated. The head avatar construction may be learned with large numbers of portrait images of various identity and motion during training. At inference time, the head avatar construction system can be readily applied to an unseen single-view image for 3D reconstruction and animation, eliminating the need for additional test-time optimization. The head avatar construction system performs 3D reconstruction and animation that simultaneously captures intricate details in a portrait image while generalizing to unseen identities without test-time optimization.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 1A illustrates a source image, target image, and an output image, in accordance with an embodiment. The source image ($I_s$) of a subject is used to construct an identity representation (neural head avatar) of the subject. The identity representation may be used to generate additional images, such as the output image ($I_o$), and/or an animation of the subject based on motion (i.e., facial pose and expressions) provided by the target image ($I_t$). Fine-grained person-specific details from the source image are transferred to the output image that depicts the subject having an expression obtained from the target image.

Figure 1B:
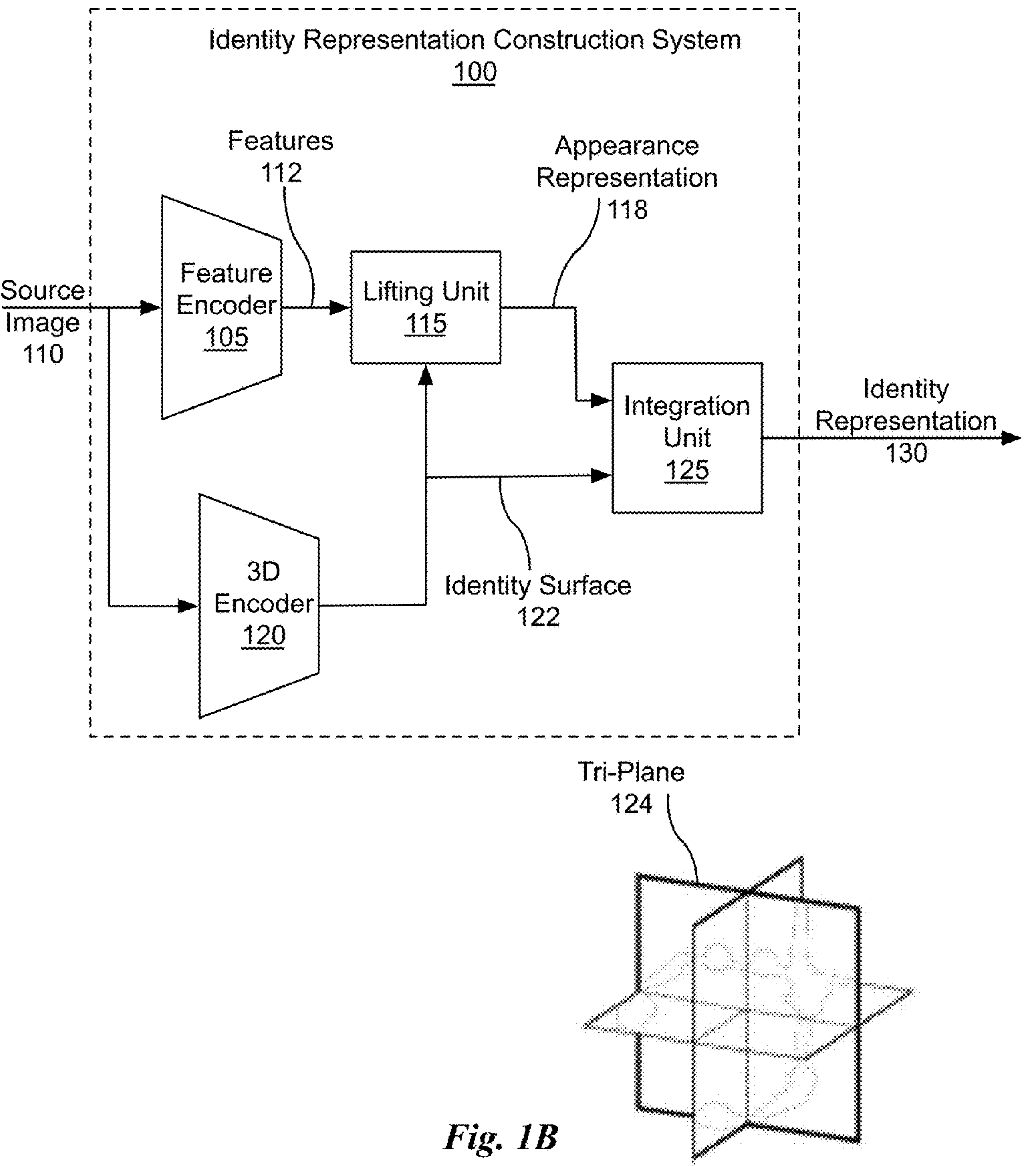
FIG. 1B illustrates a block diagram of an example identity representation construction system suitable for use in implementing some embodiments of the present disclosure.

FIG. 1B illustrates a block diagram of an example identity representation construction system 100 suitable for use in implementing some embodiments of the present disclosure. The identity representation construction system 100 comprises two processing branches that each receive the source image and produce an identity representation 130. A first processing branch is a 3D branch that processes the source image 100 to construct coarse geometry as an identity surface 122. A second processing branch is an appearance branch that processes the identity surface 122 and the source image 110 to construct an appearance representation 118 including fine-grained person-specific details.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the identity representation construction system 100 is within the scope and spirit of embodiments of the present disclosure.

The identity representation construction system 100 includes at least a feature encoder 105, lifting unit 115, 3D encoder 120, and integration unit 125. The 3D encoder 120 processes the source image 110 to produce the identity surface 122 in canonical 3D space defined by estimated locations on a surface of the subject. Given the source image 110 depicting a subject portrait captured from a camera view $C_s$, the 3D encoder 120 predicts a coarse 3D reconstruction for the subject represented as the identity surface 122, Tc. To serve as a strong geometric prior for the subsequent detailed appearance and expression modeling, two crucial properties may be imposed on the coarse reconstruction. First, the coarse reconstruction of face images captured from different camera views should be aligned in the 3D canonical space, allowing the 3D encoder 120 to generalize to single-view portrait images captured from arbitrary camera views. Second, the coarse reconstruction is forced to have a neutral expression (i.e., opened eyes and closed mouth), which facilitates transfer of the target expression to the output image.

Based on the two goals, the 3D encoder 120 ($E_c$) takes the source image 110, $I_s \in \mathbb{R}^{3\times512\times512}$ as input and, in an embodiment, predicts the identity surface 122 in a volumetric format, such as a canonicalized tri-plane $T_c \in \mathbb{R}^{3\times32\times256\times256}$. In an embodiment, the 3D encoder 120 comprises a pre-trained transformer, enabling effective mapping from the 2D input to the canonicalized 3D space. Furthermore, to ensure that $T_e$ has a neutral expression, the 3D encoder 120 is fine-tuned using an image-space loss as described in conjunction with FIG. 2A.

In an embodiment, the identity surface 122 is defined in a volumetric format, such as a tri-plane 124 (planes, each aligned with x-y axis, x-z axis, and z-y axis. In an embodiment, the identity surface 122 is defined in volumetric format comprising a point cloud or a depth image (depth map). In an embodiment, the 3D encoder 120 generates a surface (canonical) tri-plane and a depth image that is provided to the integration unit 235 and the lifting unit 115, respectively. In an embodiment, the depth image is rendered from the surface tri-plane $T_c$ from the source camera view $C_s$ to compute the 3D position of each pixel in the source image 110, producing the depth image $D_s \in R^{3\times512\times512}$. In an embodiment, the depth image is used to construct a neural point cloud, associating each pixel in the image with a point. In an embodiment, the identity surface 122 corresponds to a frontal camera view.

The feature encoder 105 extracts appearance features 112 representing intricate facial details from the source image 110. The appearance features 112 are "lifted" or mapped from 2D to 3D by the lifting unit 115, producing an appearance representation 118. Lifting the appearance features projects the features onto the volumetric format of the identity surface 122. In an embodiment, the feature encoder 105 leverages the depth image to compute the 3D position of each pixel in the image such that the facial details can be accurately "transferred" from the 2D input image to the 3D reconstruction. The 3D position (denoted as $P^{ij}$) of each pixel $$I_s^{ij}$$

in the source image $I_s$ is computed by $$P^{ij} = o + D_s^{ij} d,$$

where o and d are the ray origin and viewing direction, respectively, sampled from the camera view $C_s$ of the source image 110. Based on the 3D locations of all pixels, a neural point cloud is constructed by associating the color information from each pixel Pj in the 2D image to its corresponding 3D position $P^{ij}$. However, instead of directly using the RGB color of each pixel, the feature encoder 105 ($E_p$) extracts 2D features 112 (denoted as $F \in R^{32\times128\times128}$) from $I_s$ and associates the feature at each pixel to the point in the point cloud mapped to the pixel, providing a corresponding 3D location for the feature (i.e., a feature point). As a result, the neural point cloud is composed of all visible pixels in the image and each point is associated with a 32-dimensional feature vector. The mapping process from a 2D image to the 3D space, is referred to as "Lifting". The feature points are then projected to the volumetric format by the lifting unit 115, defining the appearance representation 118.

In an embodiment, a "rasterization" process may be used by the lifting unit 115 to convert the neural point cloud to the volumetric format of the appearance representation 118, such as another tri-plane, namely an appearance tri-plane denoted as $T_p$. For each location on the planes (i.e., the XY-, YZ-, XZ-plane) in $T_p$, a nearest point in the neural point cloud is computed and the feature of the features 112 associated with the nearest point is transferred onto the query location on the plane. The appearance tri-plane can be directly added to $T_c$ to integrate the neural point cloud into the surface tri-plane $T_c$. The integration unit 225 combines the appearance representation 118 and the identity surface 122 to produce the identity representation 130. In an embodiment, the appearance representation 118 and the identity surface 122 are summed to produce the identity representation 130.

An expression transfer system (not shown) receives both the source image 110 and target image and produces an expression representation defining a facial expression depicted in the target image. The expression representation may be combined with the identity representation 130 to render output images according to various camera views. Note that a single source image 110 may be used to construct the identity representation 130 and the identity representation 130 may then be used to produce independent images for each target image or an animation according to a target video. The subject in the target image(s) may be the same or different compared with the subject in the source image 110. In an embodiment, the identity representation 130 is transmitted to a remote device where it may be used to generate images and/or an animation.

Figure 1C:
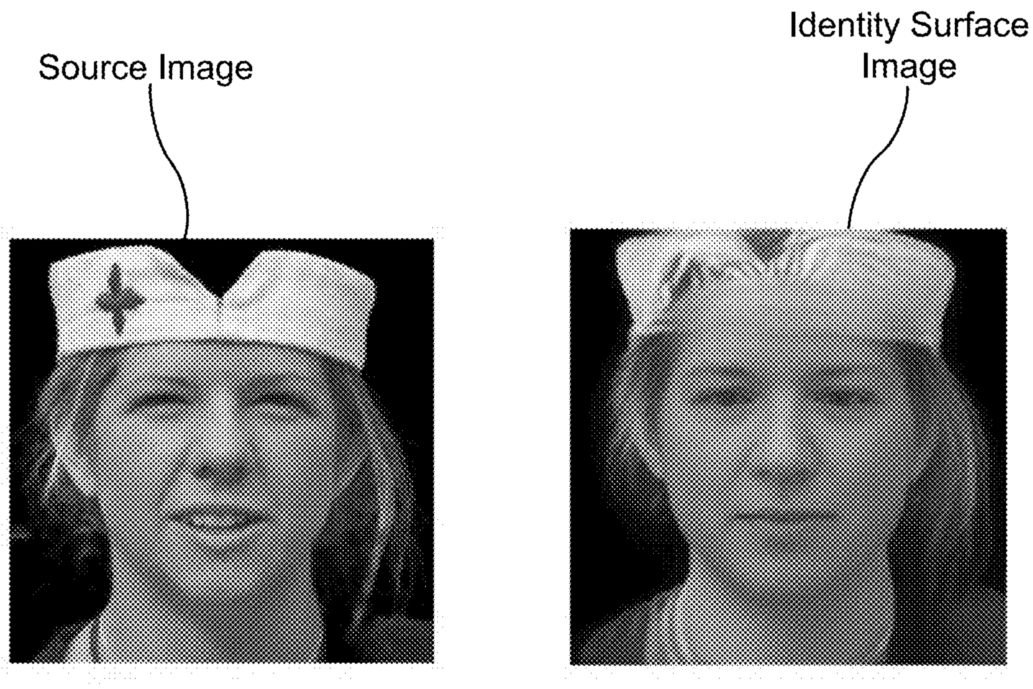
FIG. 1C illustrates a source image, target image, an identity surface image, and an identity representation image, in accordance with an embodiment.
Figure 1C:
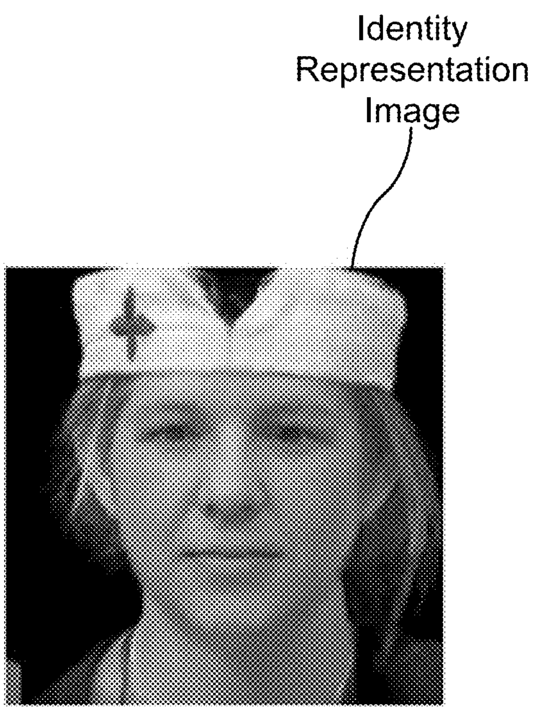

FIG. 1C illustrates a source image, an identity surface image, and an identity representation image, in accordance with an embodiment. The source image is processed by the 3D encoder 120 to produce the identity surface 122 that is rendered to produce the identity surface image $I_c$. The identity surface image depicts the subject with a neutral expression having opened eyes and closed mouth compared with the nearly closed eyes and open mouth of the subject in the source image, but the identity surface image lacks fine-grained appearance details. This is because mapping a facial portrait from the 2D input to the canonicalized 3D space is a challenging and holistic process. As a result, the 3D encoder 120 primarily focuses on aligning inputs from different camera views and neglects individual appearance details. To resolve this issue, the appearance representation 118 provides visual details from the source image that are spatially transferred to identity surface. The appearance representation 118 is integrated with the identity surface 122 to produce the identity representation 130 that is rendered to produce the identity image, improving the appearance of the identity image with subject-specific intricate facial details compared with the identity surface image. In particular, integration of the appearance representation 118 with the identity surface 122 effectively transfers the fine-grained details (e.g., pattern on the hat) from the source image onto the 3D reconstruction defined by the identity surface 122. The 3D encoder 120 is trained to generate the identity surface with a neutral expression so that the expression of the target image may be transferred to the identity representation 130 without interference. In an embodiment, the eye and mouth regions of the source image are masked when input to the feature encoder 105.

Figure 1D:
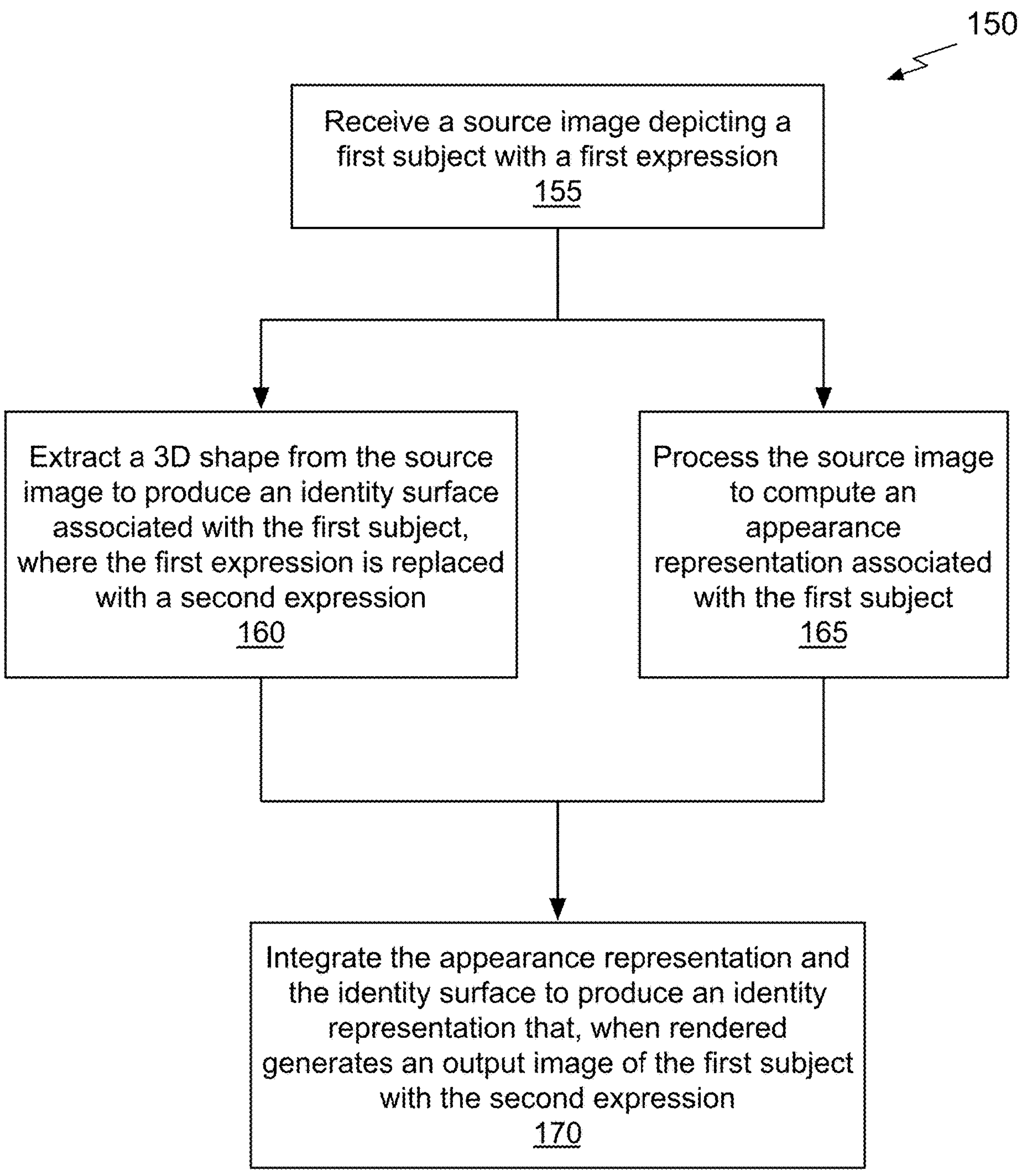
FIG. 1D illustrates a flowchart of a method for constructing a neural head avatar from an image, in accordance with an embodiment.

FIG. 1D illustrates a flowchart of a method 150 for constructing a neural head avatar from an image, in accordance with an embodiment. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the identity representation construction system of FIG. 1B. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

At step 155, a source image depicting a first subject with a first expression is received. In an embodiment, the source image is received at the identity representation construction system 100. At step 160, a 3D shape (3D geometry) is extracted from the source image to produce an identity surface associated with the first subject, where the first expression is replaced with a second expression. In an embodiment, the second expression comprises a neutral expression. In an embodiment, the 3D shape is defined by 3D locations, points, or positions. In an embodiment, the 3D encoder 120 extracts the 3D locations from the source image to produce the identity surface. In an embodiment, the 3D shape is extracted by processing the source image by one or more layers of a neural network.

At step 165, the source image is processed to compute an appearance representation associated with the first subject. In an embodiment, steps 160 and 165 are executed concurrently and/or in parallel. In an embodiment, steps 160 and 165 are executed in sequence with either step 160 or 165 executed first. In an embodiment, the source image is processed by the feature encoder 105 and the lifting unit 115 to compute the appearance representation 118. In an embodiment, the identity surface and the appearance representation are defined in a volumetric format comprising one of a point cloud or tri-plane. In an embodiment, processing the source image to compute an appearance representation comprises: processing the source image by one or more layers of a neural network to compute features; constructing a volumetric format of the 3D shape, where pixels of the source image are associated with the 3D locations defining the shape; and associating each feature computed for a respective pixel of the pixels to a 3D location of the 3D locations.

At step 170, the appearance representation and the identity surface are integrated to produce an identity representation that, when rendered generates an output image of the first subject with the second expression. In an embodiment, at least one of steps 155, 160, 165, or 170 is performed on a server or in a data center to generate at least one of an identity representation or an output image, and the identity representation or the output image is streamed to a user device. In an embodiment, at least one of steps 155, 160, 165, or 170 is performed within a cloud computing environment. In an embodiment, at least one of steps 155, 160, 165, or 170 is performed for training, testing, or certifying a neural network employed in a machine, robot, or autonomous vehicle. In an embodiment, at least one of steps 155, 160, 165, or 170 is performed on a virtual machine comprising a portion of a graphics processing unit.

Figure 2A:
FIG. 2A illustrates a block diagram of an example training framework for use in implementing some embodiments of the present disclosure.
Figure 2A:
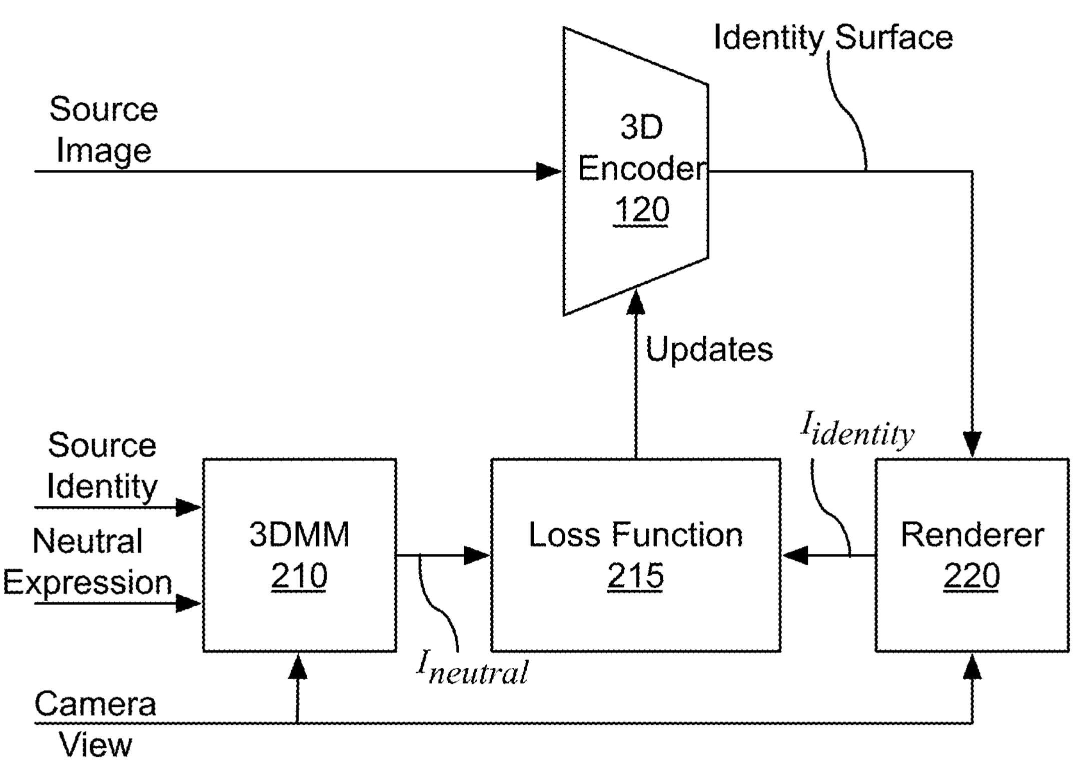

FIG. 2A illustrates a block diagram of an example training framework 200 for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the training framework 200 is within the scope and spirit of embodiments of the present disclosure.

The training configuration 200 comprises a 3D morphable model (3DMM) 210 that processes a source identity and neutral expression definition according to a camera view to generate an image. In an embodiment, different frames of a video depicting a subject are used as the source images for training. In an embodiment, the 3DMM 210 also computes a mask identifying the facial region of the image. In an embodiment, the source identity is defined by identity coefficients and the camera view corresponds to the camera view used to capture the source image. In an embodiment, the feature encoder 105, lifting unit 115, and integration unit 125 are also included in the training configuration 200.

The 3D encoder 120 processes the source image to generate the identity surface $T_c$ that is rendered by a volumetric renderer 220 to produce an identity image $I_{identity}$. The 3DMM 210 is employed to render a face with the same identity and camera pose of the source image, but with a neutral expression ($I_{neutral}$). $I_{identity}$ is encouraged to be close to the $I_{neutral}$ rendered by the 3DMM 210 within the facial region by computing an LI loss and a perceptual loss between $I_{neutral}$ and $I_{identity}$:

$$I_{identity} = \mathcal{R}_{\mathcal{V}}(T_c, C_s) \qquad \text{Eq. (1)}$$

$$I_{neutral}, m_{neutral} = \mathcal{R}_{\mathcal{M}}(\alpha_s, \beta_0, C_s)$$

$$\mathcal{L}_{neutral} = \|I_{neutral} - I_{identity} \times M_{neutral}\| + \|\phi(I_{neutral}) - \phi(I_{identity} \times M_{neutral})\|,$$

where $\mathcal{R}_v(T, C)$ is the volumetric rendering of a tri-plane T from the camera view C, Φ is a pre-trained neural network. I, $M = \mathcal{R}_{\mathcal{M}}(\alpha, \beta, C)$ is the 3DMM 210 that takes identity coefficients α, expression coefficients β as inputs, and renders the image $I_{neutral}$ and a mask M including only the facial region from camera view C. By setting $\alpha=\alpha_s$(i.e., the identity coefficients of $I_s$) and β=0 in equation (1), $I_{neutral}$ is rendered to have the same identity of $I_s$ but with a neutral expression.

Figure 2B:
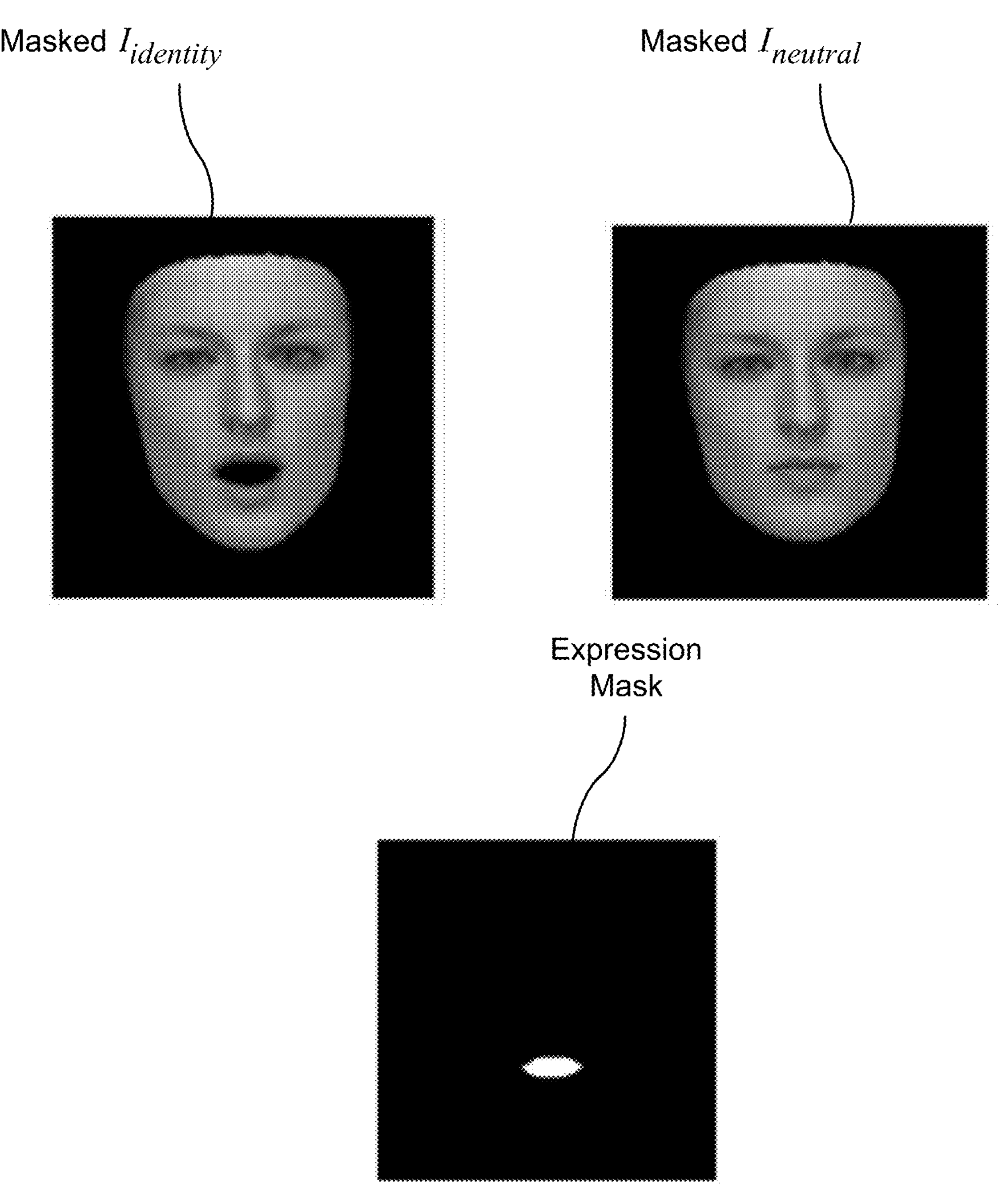
FIG. 2B illustrates a masked identity image, a masked neutral image, and an expression mask, in accordance with an embodiment.

A loss function 215 receives the rendered identity image ($I_{identity}$) and the image generated by the 3DMM 210 ($I_{neutral}$) and computes updated parameters (weights) for the 3D encoder 120 based on one or more objectives (equation 1). In an embodiment, $I_{neutral}$ only includes the facial area and the $I_{identity}$ is masked to remove regions outside of the facial area so that a facial region is isolated. In an embodiment, the loss function applies the L1 loss within the facial region. FIG. 2B illustrates a masked identity image, a masked neutral image, and an expression mask, in accordance with an embodiment.

While 3DMMs provide a strong prior for understanding of human faces, 3DMMs are inherently limited in two ways. First, they exclusively focus on the facial region and fail to capture other characteristic details such as hairstyle, eyeglasses, inner mouth etc. Second, the geometry and texture fidelity of the reconstructed 3D faces are limited by mesh resolution, leading to unrealistic appearance in the rendered images.

The geometry prior from a 3DMM represents the shape and texture of a portrait as:

$$S = \bar{S} + B_{id}\alpha + B_{exp}\beta$$

$$T = \bar{T} + B_{tex}\delta$$

where $\bar{S}$, $\bar{T}$ are the mean shape and texture of human faces, $B_{id}$, $B_{exp}$, $B_{tex}$ are the shape, expression and texture bases, and α, β, δ are coefficients that linearly combine the shape, expression and texture bases, respectively. Because the shape and expression components are primarily utilized, the texture and illumination modules may be ignored and the rendering operation from a camera view C may be denoted as I, M=$\mathcal{R}_{\mathcal{M}}$ (α, β,C), where I is the rendered image, and M is the rendered mask that only includes the facial region.

Figure 2C:
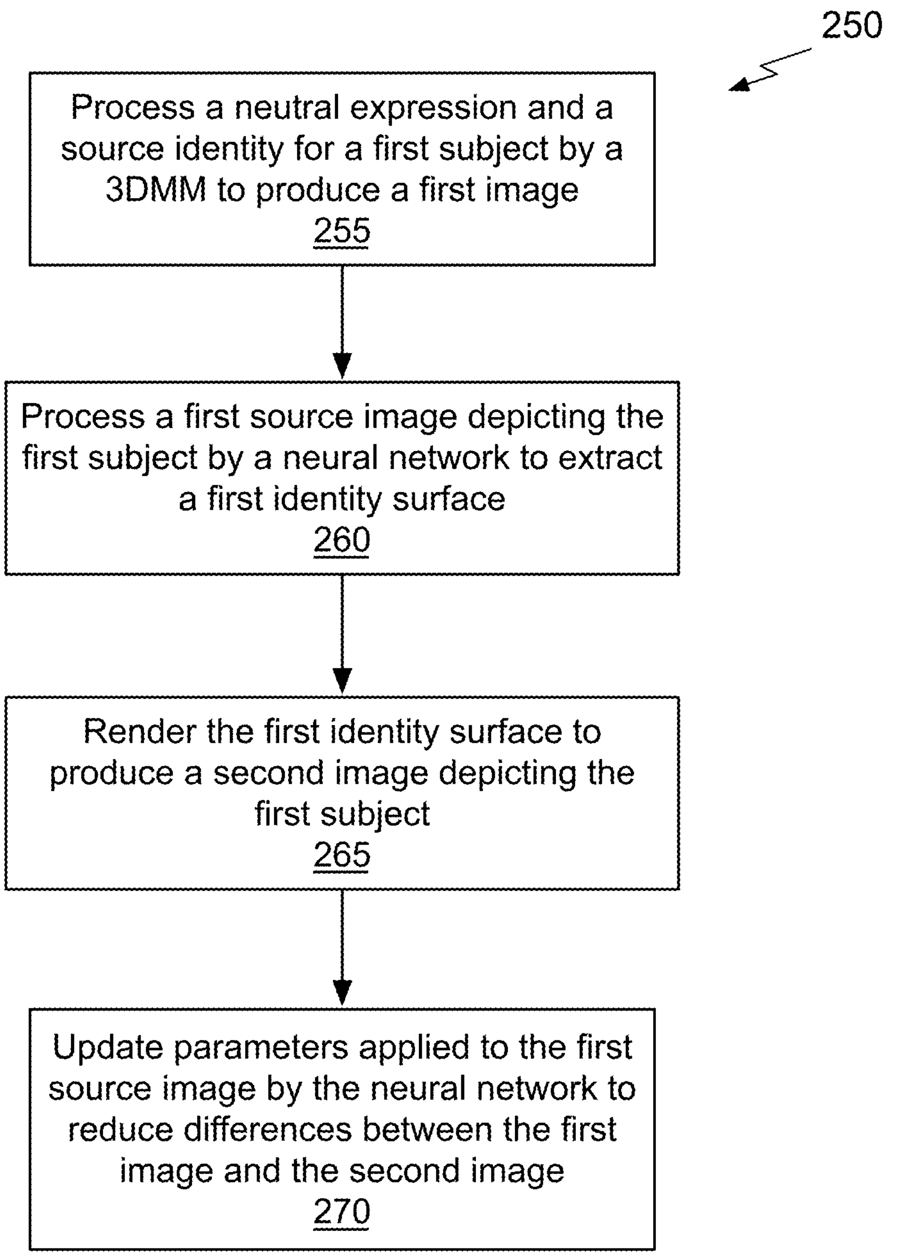
FIG. 2C illustrates a flowchart of a method for training the 3D encoder suitable for use in implementing some embodiments of the present disclosure.

FIG. 2C illustrates a flowchart of a method 250 for training the 3D encoder 120 suitable for use in implementing some embodiments of the present disclosure. In an embodiment, the method 250 is performed by the training framework 200. Each block of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 250 is described, by way of example, with respect to the training framework 200 of FIG. 2A. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

At step 255, a neutral expression and a source identity for a first subject are processed by a 3DMM to produce a first image. In an embodiment the 3DMM comprises the 3DMM 210. At step 260, a first source image depicting the first subject by a neural network to extract a first identity surface. In an embodiment the neural network comprises the 3D encoder 120. At step 265, the first identity surface is rendered to produce a second image depicting the first subject. In an embodiment, the first image and the second image comprise $I_{neutral}$ and $I_{identity}$. At step 270, parameters applied to the first source image by the neural network are updated to reduce differences between the first image and the second image. In an embodiment, the parameters are updated by the loss function 215. In an embodiment, an appearance representation generated by the feature encoder 105 and lifting unit 115 is integrated with the identity surface to produce a first identity representation that is rendered instead of the first identity surface to produce the second image. In an embodiment, the parameters include parameters applied by the feature encoder 105 to generate the first appearance representation.

The 3D branch comprising the 3D encoder 120 and the appearance branch comprising the feature encoder 105 and the lifting unit 115 reconstruct the coarse geometry and fine-grained person-specific details, respectively, from the source image 110. An expression branch is employed to align the identity representation 130 (constructed 3D neural avatar) with the expression in a target image. In an embodiment, the expression branch comprises a 3DMM and an expression encoder.

Figure 3A:
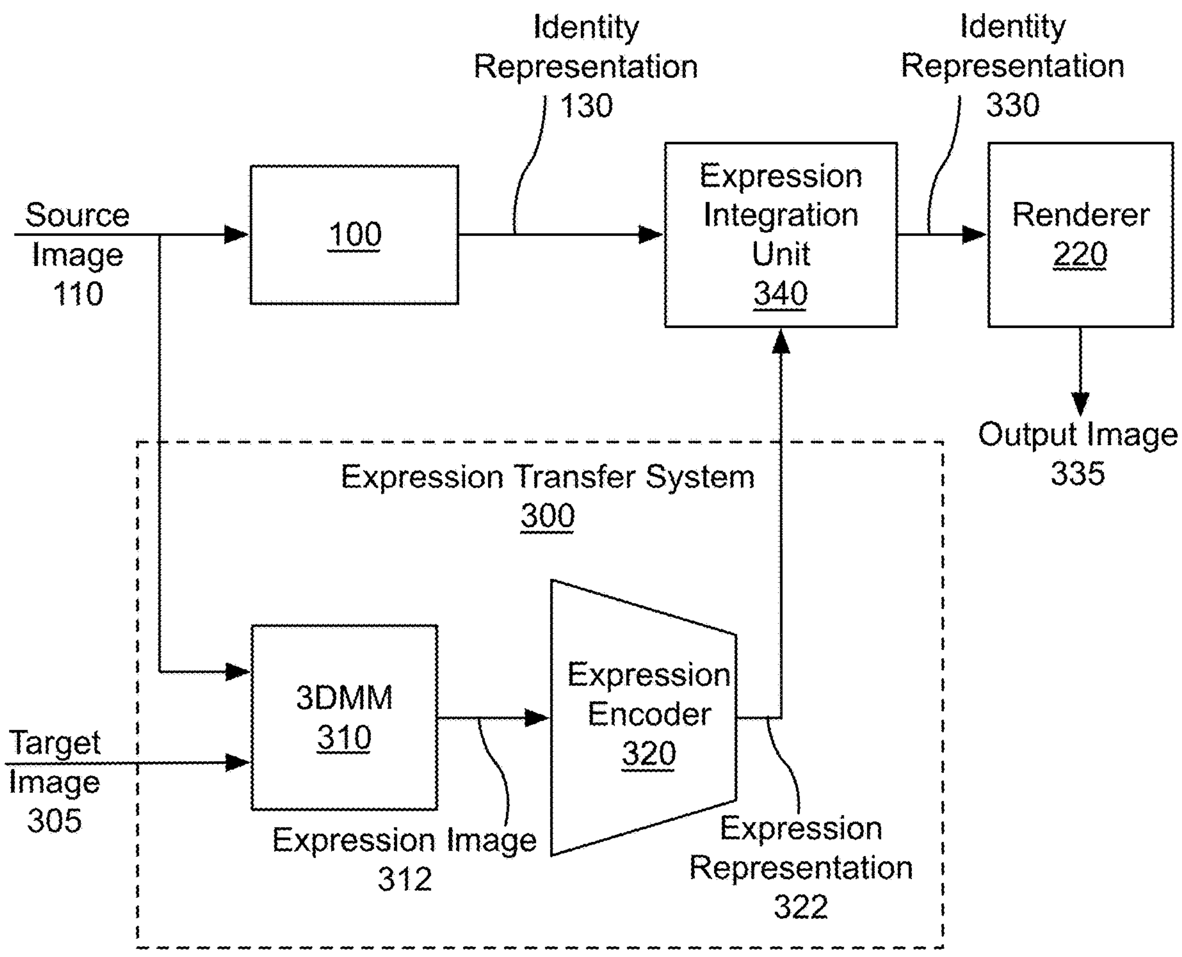
FIG. 3A illustrates a block diagram of an example neural head avatar animation system suitable for use in implementing some embodiments of the present disclosure.

FIG. 3A illustrates a block diagram of an example neural head avatar animation system suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the neural head avatar animation system is within the scope and spirit of embodiments of the present disclosure.

The trained identity representation construction system 100 may be used in conjunction with an expression branch, such as an expression transfer system 300. The expression transfer system 300 includes a 3DMM 310 and an expression encoder 320. The 3DMM 310 processes the source image 110 and a target image 305, extracting the source identity from the source image 110 and an expression from the target image 305. The 3DMM 310 then generates an expression image 312 depicting a frontal view of the source subject with the target expression. The expression encoder 320 processes the expression image 312 to produce an expression representation 322. In an embodiment, the expression encoder 320 is trained to hallucinate realistic inner mouth according to the target expression. In an embodiment, an expression mask (example shown in FIG. 2B) computed by the 3DMM 310 is applied to the source image 110, removing the expression for input to the feature encoder 105. In an embodiment, the expression representation 322 is defined in a volumetric format comprising one of a point cloud or tri-plane, such as an expression a tri-plane $T_{exp}$ that aligns the reconstructed 3D avatar to the target expression.

Expression reconstruction and transfer is a challenging task. Naively predicting the expression from an image presents difficulties in disentangling identity, expression, and head rotation. Meanwhile, 3DMMs provide a well-established expression representation that captures common human expressions effectively. However, the compact expression coefficients in 3DMMs are highly correlated with the expression bases and do not include spatially varying deformation details. As a result, conditioning a neural network, such as the expression encoder 320, solely on the expression coefficients for expression modeling can be challenging. Instead, the expression transfer system 300 fully leverages the expression prior in any 3DMM and seamlessly integrates with the 3D and appearance branches. The core idea is to provide the expression encoder 320 with target expression information using an expression image 312 (e.g., a 2D rendering) generated by the 3DMM 310 instead of the expression coefficients.

As shown in FIG. 3A, given the source image 110 $I_s$ and target image 305 $I_t$, the corresponding shape and expression coefficients denoted as $\alpha_s$ and $\beta_t$ respectively, are predicted using the 3DMM 310. By combining $\alpha_s$ and $\beta_t$, a frontal-view facial image is rendered as the expression image 312 $I_{exp}=\mathcal{R}_{\mathcal{M}}(\alpha_s, \beta_t, C_{front})$, where $C_{front}$ is a pre-defined frontal camera pose. The expression encoder 320 (denoted as Ee) that takes $I_{exp}$ as input and produces an expression representation 322, such as a tri-plane $T_e \in \mathbb{R}^{3\times32\times256\times256}$ Note that $I_{exp}$ is rendered in the pre-defined frontal view so that the expression encoder 320 can focus on modeling expression changes only and ignore motion changes caused by head rotation. Moreover, the expression encoder 320 also learns to hallucinate realistic inner mouths (e.g., teeth) according to the target expression, as $I_{exp}$ does not model the inner mouth region.

An expression integration unit 340 combines the expression representation 322 with the identity representation 130 to produce an identity representation 330, modifying the neutral expression of the identity representation 130 to match the expression of the target image 305. In an embodiment, the expression integration unit 340 sums $T_e$ with the sum of $T_c$ and $T_a$ output by the identity representation construction system 100 as the identity representation 130. In an embodiment, the source image 110 and the identity representation 130 are transmitted to a remote device that comprises the expression transfer system 300, expression integration unit 340, and the renderer 220. The remote device is configured to generate one or more output images 335 depicting the subject of the source image 310 having an expression according to one or more target images 305.

The identity representation 330 may be rendered by the volumetric renderer 220 to produce an output image 335 depicting the source subject having the expression of a subject depicted in the target image 305. In an embodiment, one or more neural network encoders within the systems 100 and 300 may be trained based on image space losses to improve multi-view consistency, smooth tri-plane construction, etc. In an embodiment, the output image 335 may be further processed by a super-resolution block to synthesize a high-fidelity image with the desired identity and motion.

Figure 3B:
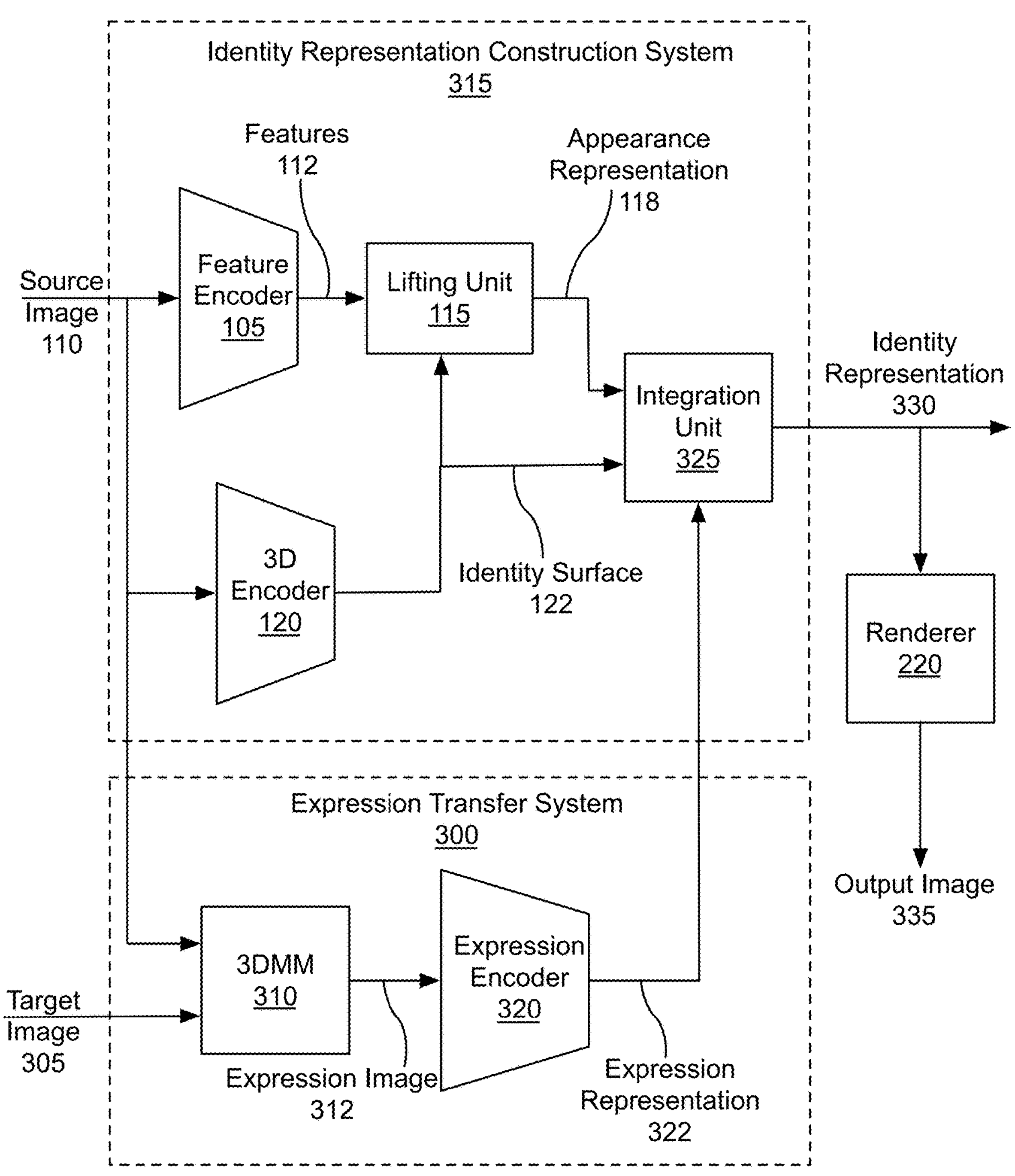
FIG. 3B illustrates a block diagram of another example neural head avatar animation system suitable for use in implementing some embodiments of the present disclosure.

FIG. 3B illustrates a block diagram of another example neural head avatar animation system suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the neural head avatar animation system is within the scope and spirit of embodiments of the present disclosure.

An identity representation construction system 315 includes the 3D branch and the appearance branch from the identity representation construction system 100 with the integration unit 125 replaced with an integration unit 325. The integration unit 325 combines the appearance representation 118, the identity surface 122, and the expression representation 322 to compute the identity representation 330. In an embodiment, the integration unit 325 sums $T_e$, $T_c$, and Ta. In an embodiment, one or more neural network encoders within the systems 315 and 300 may be trained based on image space losses to improve multi-view consistency, smooth tri-plane construction, etc. In an embodiment, the output image 335 may be further processed by a super-resolution block to synthesize a high-fidelity image with the desired identity and motion.

Figure 3C:
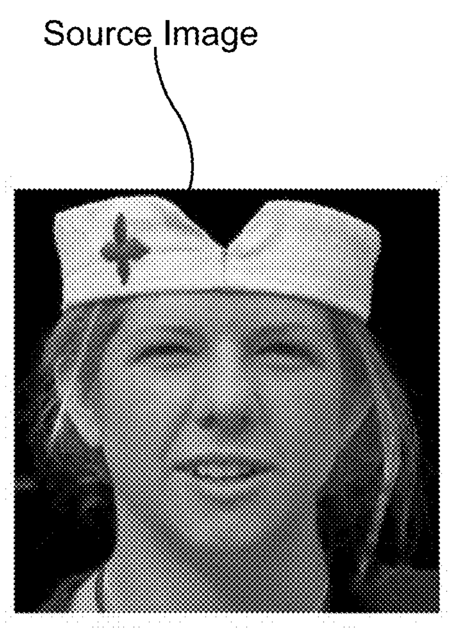
FIG. 3C illustrates a target image, combined identity surface and expression representation image, and an entire system image, in accordance with an embodiment.
Figure 3C:
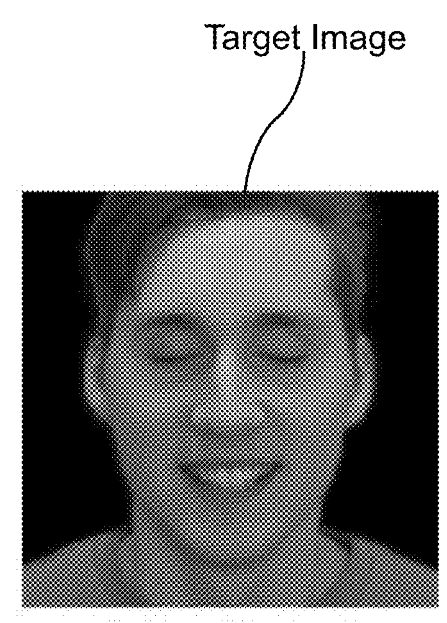
Figure 3C:
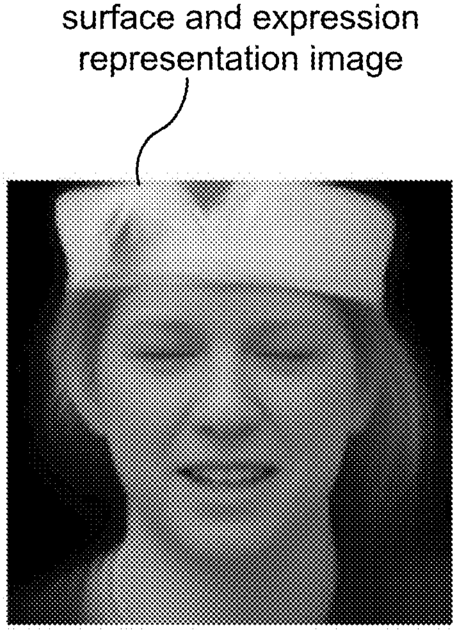
Figure 3C:

FIG. 3C illustrates a source image, a target image, a combined identity surface and expression representation image, and an output image, in accordance with an embodiment. The combined identity surface and expression representation image is rendered by combining the identity surface 122 and the expression representation 322, where the target expression from the target image is effectively transferred onto the source image through the expression representation 322. Compared with the output image that is rendered from the identity representation 330, details of the subject in the source image are missing or poorly defined in the combined identity surface and expression representation image.

Figure 3D:
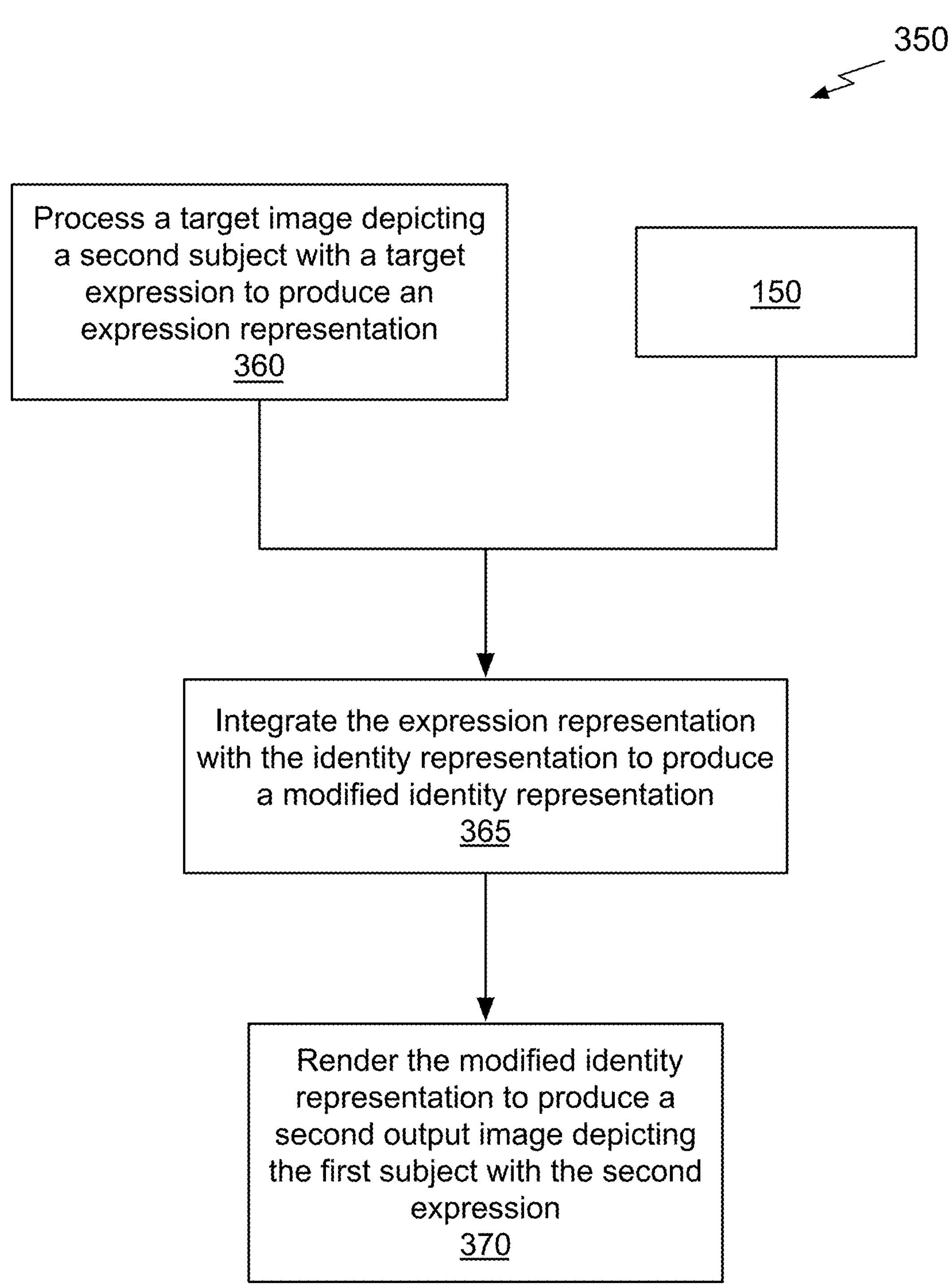
FIG. 3D illustrates a flowchart of a method for animating a neural head avatar from an image, in accordance with an embodiment.

FIG. 3D illustrates a flowchart of a method 350 for animating a neural head avatar from an image, in accordance with an embodiment. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the neural head avatar animation systems of FIGS. 3A and 3B. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 360, a target image depicting a second subject with a target expression is processed to produce an expression representation. In an embodiment, steps 150 and 360 are executed concurrently and/or in parallel. In an embodiment, steps 150 and 360 are executed in sequence with either step 160 or 165 executed first. In an embodiment, the expression representation defines a facial expression and a facial pose. In an embodiment, the first subject and the second subject are the same (equal). In an embodiment, the first subject is different compared with the second subject.

At step 365, the expression representation is integrated with the identity representation to produce a modified identity representation. At step 370, the modified identity representation is rendered to produce a second output image depicting the first subject with the second expression. In an embodiment, additional target images of the second subject with additional expressions are processed to produce additional expression representations, the additional expression representations are integrated with the identity representation to produce additional modified identity representations, and the additional modified identity representations are rendered to produce additional output images depicting the first subject with the additional expressions. The additional output image may comprise a video animation of the first subject.

In an embodiment, a multi-stage training schedule is used to promote multi-view consistent reconstructions, as well as to reduce the overall training time. In a first stage, training uses a reconstruction objective and the neutral expression loss as shown in equation (1). Specifically, the rendering of a) the identity surface 122 (i.e., $I_{identity}=\mathcal{R}(T_c, C_t)$), is compared with b) a rendering of the combination of the identity surface 122 and the expression representation 322 (i.e., $I_{e+identity}=\mathcal{R}_v(T_e+T_c\ C_t)$) and c) a rendering of the combination of the identity representation 130 (the identity surface 122 and the appearance representation 118) and the expression representation 322 (i.e., $I_{e+p+identity}=\mathcal{R}_v(T_e+T_p+T_c, C_t)$) with the target image via the L1 and the perceptual losses similarly to equation (1):

$$\mathcal{L}_1 = \|I_{identity} - I_t\| + \|(I_{e+identity}) - I_t\| + \|(I_{e+p+identity}) - I_t\|,$$

$$\mathcal{L}_p = \|\phi(I_{identity}) - \phi(I_t)\| + \|\phi(I_{e+identity}) - \phi(I_t)\| + \|\phi(I_{e+p+identity}) - \phi(I_t)\|.$$

Intuitively, applying supervision to different combinations of the 3D branch, appearance branch, and expression branch to predict meaningful reconstruction in all three branches. To encourage smooth tri-plane reconstruction, an additional loss TV is adopted. The training objective for the first stage is $\mathcal{L}^1=\lambda_1\mathcal{L}_1+\lambda_p\mathcal{L}_p+\lambda_{TV}\mathcal{L}_{TV}+\lambda_{neutral}\mathcal{L}_{neutral}$, where $\lambda_x$ is the weight of the corresponding objective.

In the second stage, to encourage multi-view consistency, a super-resolution module is fine-tuned and while the 3D branch, appearance branch, and expression branch are all frozen. All the losses in the first stage are used with a dual discriminator that takes the concatenation of the low-resolution rendering and the high-resolution reconstruction as input. Specifically, a logistic formulation of an adversarial loss is used $$L_{adv} = \mathbb{E}_{(I_o^l, I_o)} softplus\left(D\left(I_o^l \oplus I_o\right)\right),$$

where $$I_o^l$$

is the upsampled version of the low-resolution rendered image and $\oplus$ represents the concatenation operation. The overall training objective of the second stage is $\mathcal{L}^2=\mathcal{L}^1+\lambda_{adv}\mathcal{L}_{adv}$.

The neural head avatar animation systems are capable of generating photorealistic output images from unseen source and target images (no subject-specific training is needed) with multi-view and temporal consistency. The 3D branch and appearance reconstruct the coarse shape and texture of a portrait source image with a neutral expression, capturing appearance details in the source image and producing an identity representation. The expression branch generates an expression representation enabling transfer of expression from the target image onto the identity representation, resulting in an output image depicting the subject of the source image having the expression from the target image. The 3D head avatar (identity representation 130 or 330) may be reconstructed from a single source image and animated using one or more target images.

Parallel Processing Architecture

Figure 4:
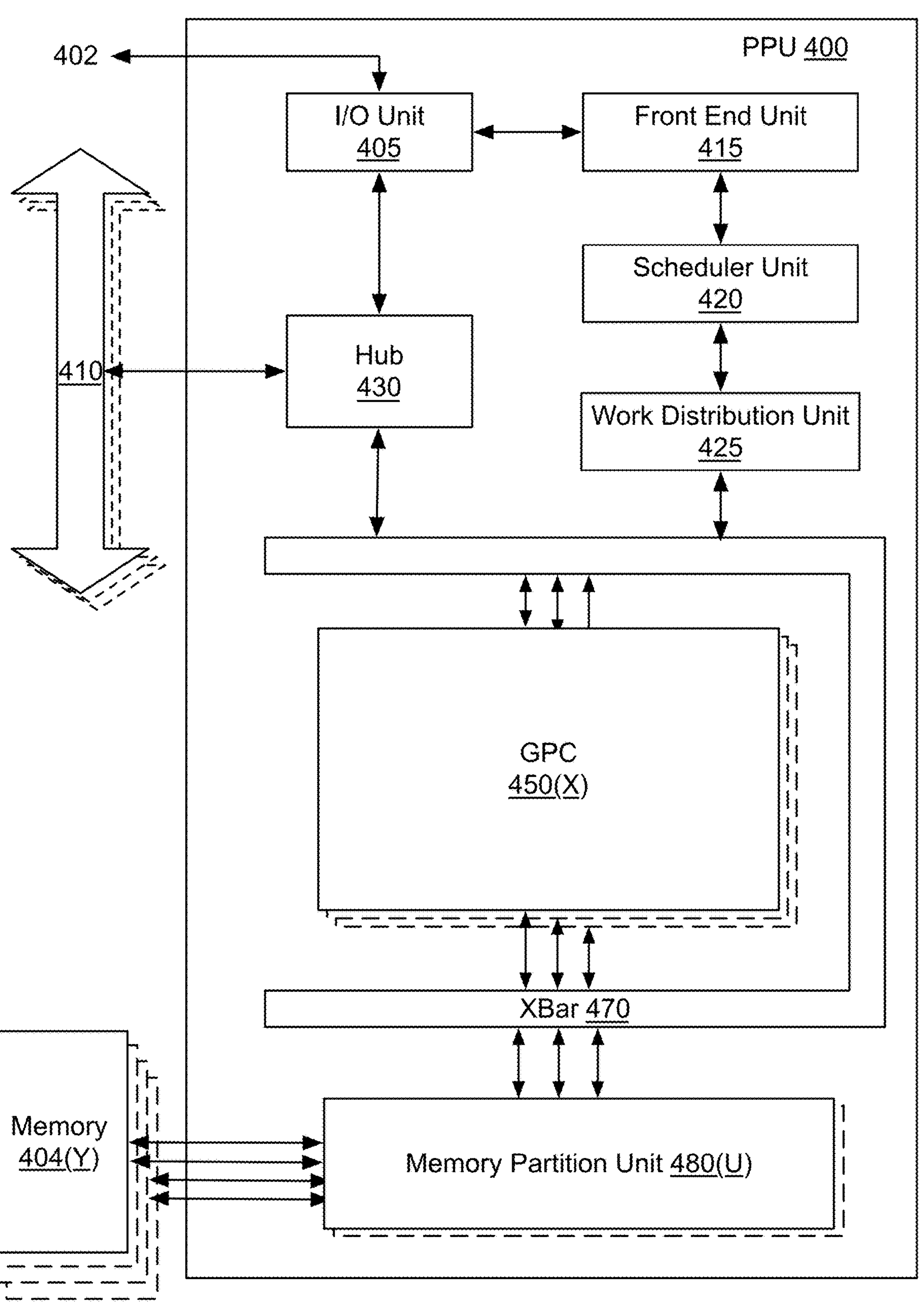
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the identity representation construction system 100 the training framework 200, and/or the neural head avatar animation systems of FIGS. 3A and 3B. The PPU 400 may be used to implement one or more of the feature encoder 105, lifting unit 115, 3D encoder 120, integration unit 125, integration unit 325, expression integration unit 340, 3DMM 210, 3DMM 310, expression encoder 320, loss function 215, and renderer 220. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in an L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
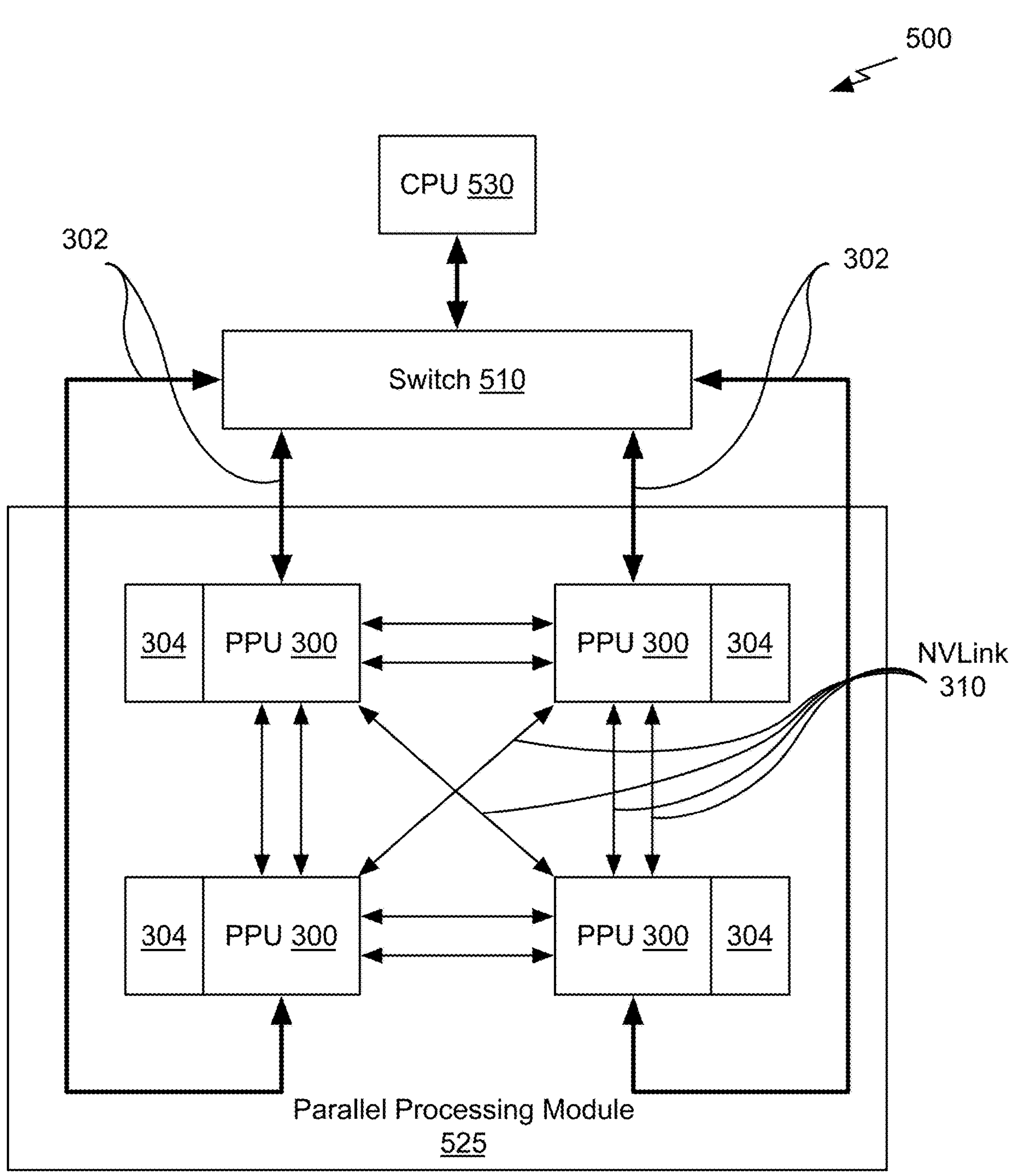
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement one or more of the methods 150, 250, or 350 shown in FIGS. 1D, 2C, and 3D, respectively. The processing system 500 includes a CPU 530, switch 510, and multiple PPUs 400, and respective memories 404.

Figure 5B:
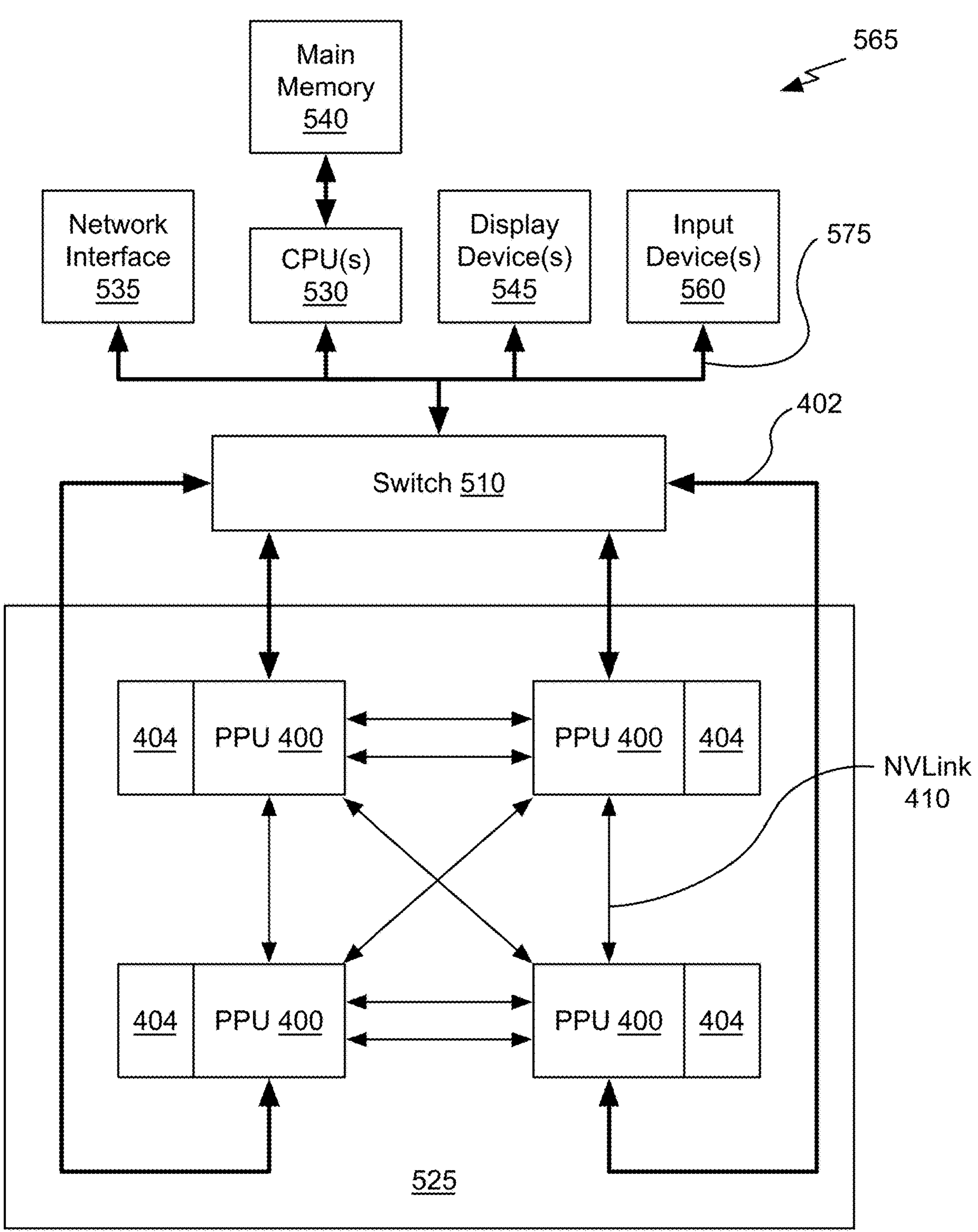
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement one or more of the methods 150, 250, or 350 shown in FIGS. 1D, 2C, and 3D, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
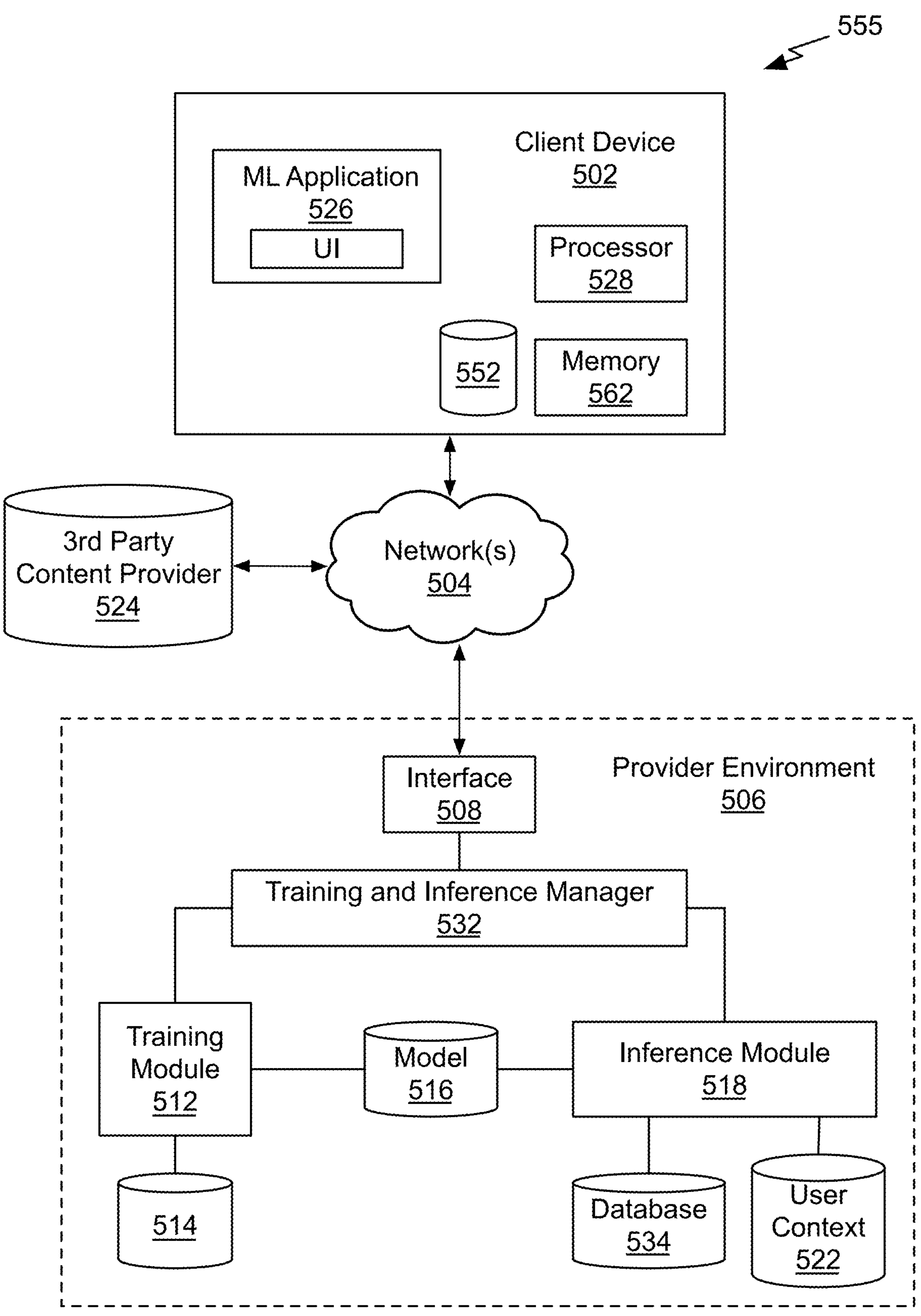
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
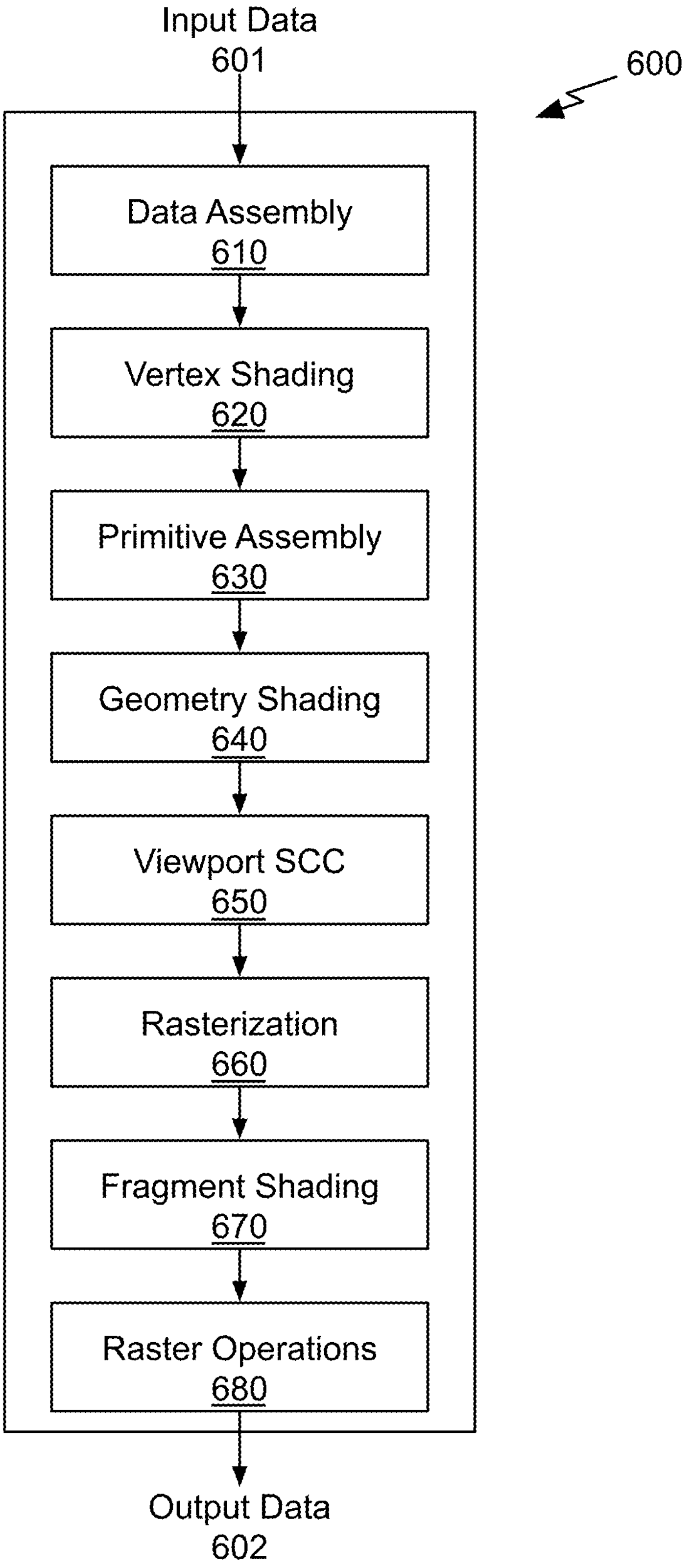
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6B:
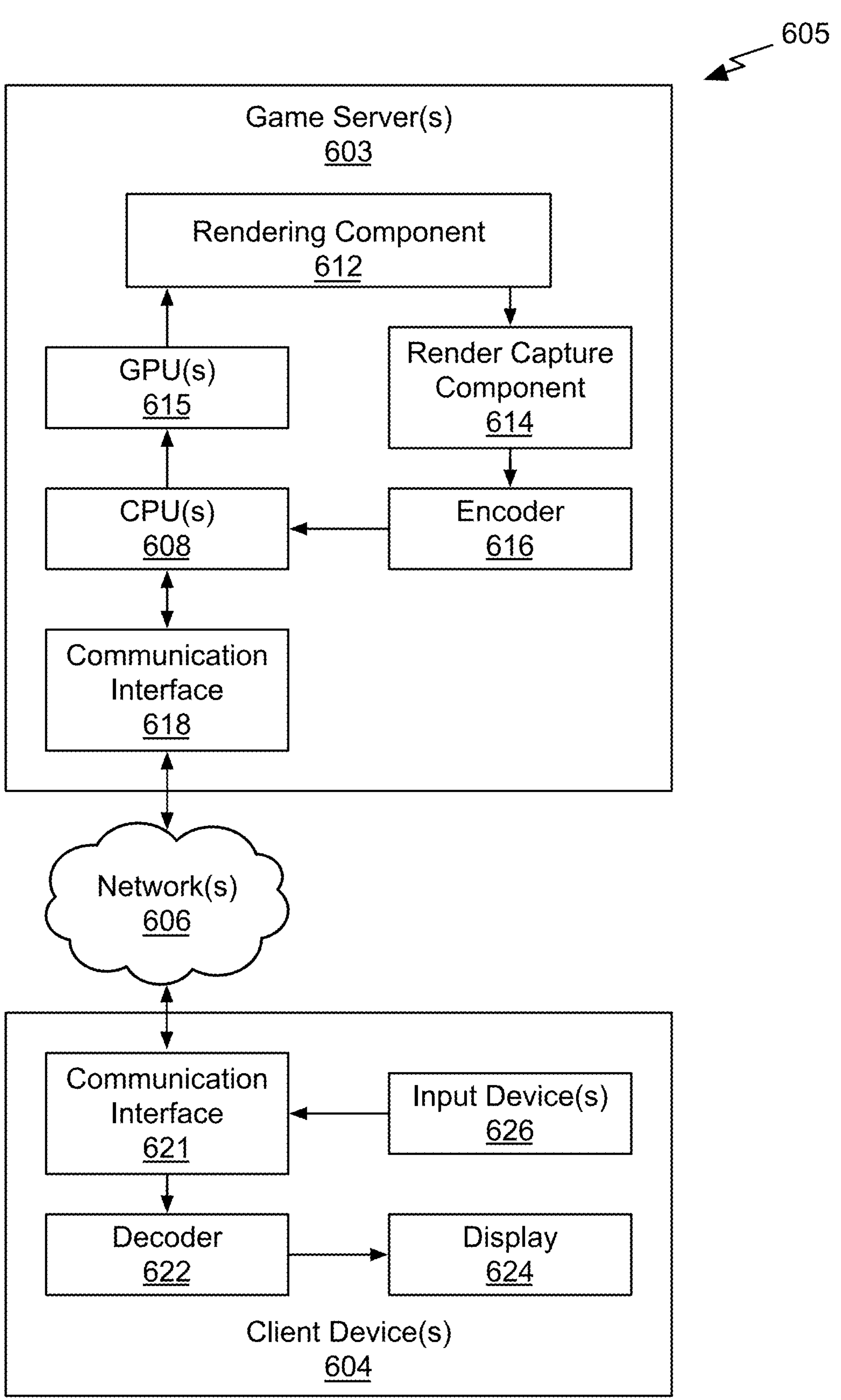
FIG. 6B illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:

receiving a source image depicting a first subject with a first expression;

extracting a three-dimensional (3D) shape from the source image to produce an identity surface associated with the first subject, wherein the first expression is replaced with a second expression;

processing the source image to compute an appearance representation associated with the first subject;

integrating the appearance representation and the identity surface to produce an identity representation that, when rendered generates an output image of the first subject with the second expression;

processing a target image depicting a second subject with a target expression to produce an expression representation;

integrating the expression representation with the identity representation to produce a modified identity representation; and rendering the modified identity representation to produce a second output image depicting the first subject with the target expression.

2. The computer-implemented method of claim 1, wherein the second expression comprises a neutral expression.

3. The computer-implemented method of claim 2, wherein the neutral expression is frontal view with open eyes and a closed mouth.

4. The computer-implemented method of claim 1, wherein the expression representation defines a facial expression and a facial pose.

5. The computer-implemented method of claim 1, further comprising:

processing additional target images of the second subject with additional expressions to produce additional expression representations;

integrating the additional expression representations with the identity representation to produce additional modified identity representations; and rendering the additional modified identity representations to produce additional output images depicting the first subject with the additional expressions.

6. The computer-implemented method of claim 1, wherein the first subject is different compared with the second subject.

7. The computer-implemented method of claim 1, wherein the first subject equals the second subject.

8. The computer-implemented method of claim 1, wherein the identity surface and the appearance representation are defined in a volumetric format comprising one of a point cloud or tri-plane.

9. A computer-implemented method, comprising:

receiving a source image depicting a first subject with a first expression;

extracting a three-dimensional (3D) shape from the source image to produce an identity surface associated with the first subject, wherein the first expression is replaced with a second expression;

processing the source image by one or more layers of a neural network to compute features;

constructing a volumetric format of the 3D shape, wherein pixels of the source image are associated with 3D locations that define the shape; and associating each feature computed for a respective pixel of the pixels to a 3D location of the 3D locations to compute an appearance representation associated with the first subject; and integrating the appearance representation and the identity surface to produce an identity representation that, when rendered generates an output image of the first subject with the second expression.

10. The computer-implemented method of claim 1, wherein the 3D shape is extracted by processing the source image by one or more layers of a neural network.

11. A computer-implemented method, comprising:

receiving a source image depicting a first subject with a first expression;

extracting a three-dimensional (3D) shape from the source image, by processing the source image by one or more layers of a neural network, to produce an identity surface associated with the first subject, wherein the first expression is replaced with a second expression;

processing the source image to compute an appearance representation associated with the first subject; and integrating the appearance representation and the identity surface to produce an identity representation that, when rendered generates an output image of the first subject with the second expression, wherein the neural network is trained by:

processing a neutral expression and a source identity for a first subject by a 3D morphable model to produce a first image;

processing a first source image depicting the first subject by the neural network to extract a first identity surface;

rendering the first identity surface to produce a second image depicting the first subject; and updating parameters applied to the first source image by the neural network to reduce differences between the first image and the second image.

12. The computer-implemented method of claim 1, wherein at least one of the steps of receiving, extracting, processing, or integrating is performed on a server or in a data center to generate at least one of an identity representation or an output image, and the identity representation or the output image is streamed to a user device.

13. The computer-implemented method of claim 1, wherein at least one of the steps of receiving, extracting, processing, or integrating is performed within a cloud computing environment.

14. The computer-implemented method of claim 1, wherein at least one of the steps of receiving, extracting, processing, or integrating is performed for training, testing, or certifying a neural network employed in a machine, robot, or autonomous vehicle.

15. The computer-implemented method of claim 1, wherein at least one of the steps of receiving, extracting, processing, or integrating is performed on a virtual machine comprising a portion of a graphics processing unit.

16. A system, comprising:

a memory that stores a source image depicting a first subject with a first expression; and a processor that is connected to the memory, wherein the processor is configured to:

extract a three-dimensional (3D) shape from the source image to produce an identity surface associated with the first subject, wherein the first expression is replaced with a second expression;

process the source image to compute an appearance representation associated with the first subject;

integrate the appearance representation and the identity surface to produce an identity representation that, when rendered generates an output image of the first subject with the second expression;

process a target image of a second subject with a target expression to produce an expression representation;

integrate the expression representation with the identity representation to produce a modified identity representation; and render the modified identity representation to produce a second output image depicting the first subject with the target expression.

17. The system of claim 16, wherein the expression representation defines a facial expression and a facial pose.

18. A machine readable medium having stored thereon a set of instructions that, when executed by one or more processors, cause the one or more processors to at least:

receive a source image depicting a first subject with a first expression;

extract a three-dimensional (3D) shape from the source image to produce an identity surface associated with the first subject, wherein the first expression is replaced with a second expression;

process the source image to compute an appearance representation associated with the first subject;

integrate the appearance representation and the identity surface to produce an identity representation that, when rendered generates an output image of the first subject with the second expression;

process a target image depicting a second subject with a target expression to produce an expression representation;

integrate the expression representation with the identity representation to produce a modified identity representation; and render the modified identity representation to produce a second output image depicting the first subject with the target expression.

19. The system of claim 16, wherein the second expression comprises a neutral expression.

20. A system, comprising:

a memory that stores a source image depicting a first subject with a first expression; and a processor that is connected to the memory, wherein the processor is configured to:

extract a three-dimensional (3D) shape from the source image to produce an identity surface associated with the first subject, wherein the first expression is replaced with a second expression;

process the source image to compute an appearance representation associated with the first subject;

construct a volumetric format of the 3D shape, wherein pixels of the source image are associated with 3D locations that define the shape;

associate each feature computed for a respective pixel of the pixels to a 3D location of the 3D locations to compute an appearance representation associated with the first subject; and integrate the appearance representation and the identity surface to produce an identity representation that, when rendered generates an output image of the first subject with the second expression.

21. A system, comprising:

a memory that stores a source image depicting a first subject with a first expression; and a processor that is connected to the memory, wherein the processor is configured to:

extract a three-dimensional (3D) shape from the source image to produce an identity surface associated with the first subject, wherein the first expression is replaced with a second expression;

process the source image to compute an appearance representation associated with the first subject; and integrate the appearance representation and the identity surface to produce an identity representation that, when rendered generates an output image of the first subject with the second expression, wherein the neural network is trained by:

processing a neutral expression and a source identity for a first subject by a 3D morphable model to produce a first image;

processing a first source image depicting the first subject by the neural network to extract a first identity surface;

rendering the first identity surface to produce a second image depicting the first subject; and updating parameters applied to the first source image by the neural network to reduce differences between the first image and the second image.

22. The machine readable medium of claim 18, wherein the expression representation defines a facial expression and a facial pose.

23. The machine readable medium of claim 18, wherein the second expression comprises a neutral expression.

* * * * *